(12) United States Patent
Raymond et al.

(10) Patent No.: US 7,457,039 B2
(45) Date of Patent: Nov. 25, 2008

(54) LENTICULAR DISPLAY SYSTEM WITH A LENS SHEET SPACED APART FROM A PAIRED INTERLACED IMAGE

(75) Inventors: Mark A. Raymond, Littleton, CO (US); Seth Weiss, Cherry Hills Village, CO (US)

(73) Assignee: Genie Lens Technologies, LLC, Golden, CO (US)

( * ) Notice: Subject to any disclaimer, the term of this patent is extended or adjusted under 35 U.S.C. 154(b) by 47 days.

(21) Appl. No.: 11/675,995

(22) Filed: Feb. 16, 2007

(65) Prior Publication Data

US 2007/0285804 A1  Dec. 13, 2007

(51) Int. Cl.
*G02B 27/10* (2006.01)

(52) U.S. Cl. ..................... 359/619; 359/623

(58) Field of Classification Search .................. 359/619, 359/620, 623
See application file for complete search history.

(56) References Cited

U.S. PATENT DOCUMENTS

| | | | |
|---|---|---|---|
| 4,498,736 A | 2/1985 | Griffin | |
| 5,204,775 A | 4/1993 | McDevitt | |
| 5,303,322 A | 4/1994 | Winston et al. | |
| 5,351,339 A | 10/1994 | Reuber et al. | |
| 5,362,351 A | 11/1994 | Karszes | |
| 5,548,450 A | 8/1996 | Kang | |
| 5,644,431 A | 7/1997 | Magee | |
| 5,647,151 A | 7/1997 | Fantone et al. | |
| 5,833,068 A | 11/1998 | Fantone | |
| 5,850,913 A | 12/1998 | Fantone et al. | |
| 6,070,350 A | 6/2000 | Fantone et al. | |
| 6,084,713 A | 7/2000 | Rosenthal | |
| 6,226,907 B1 | 5/2001 | Conley et al. | |
| 6,256,149 B1 | 7/2001 | Rolfe | |
| 6,551,014 B2 | 4/2003 | Khieu et al. | |
| 6,624,947 B2 | 9/2003 | McKinley | |
| 6,943,953 B2 | 9/2005 | Raymond | |
| 6,984,425 B2 | 1/2006 | Raymond | |
| 7,002,748 B1 | 2/2006 | Conley et al. | |
| 7,075,736 B1 | 7/2006 | Lundgren | |
| 7,119,963 B1 * | 10/2006 | Cassara | 359/619 |
| 7,234,257 B2 | 6/2007 | Bar-Yona | |
| 7,290,802 B1 * | 11/2007 | Scarbrough et al. | 359/619 |
| 2002/0085287 A1 | 7/2002 | Egawa | |
| 2004/0263969 A1 | 12/2004 | Lipton et al. | |
| 2005/0053737 A1 | 3/2005 | Raymond et al. | |
| 2006/0283749 A1 * | 12/2006 | Wolfe et al. | 359/619 |

* cited by examiner

*Primary Examiner*—Alicia M Harrington
(74) *Attorney, Agent, or Firm*—Marsh Fischmann & Breyfogle LLP; Kent A. Lembke

(57) ABSTRACT

A packaged container for producing a graphical image. The packaged container includes a container having a side wall defining an interior space and a recessed surface. An interlaced image is provided on the recessed surface, and the packaged container includes a lens element positioned on the side wall to extend across the recessed surface proximate to the printed image and to leave a focusing gap between the lens element and the interlaced image. The lens element includes a plurality of lenses each having a focal point on or about the interlaced image. The lenses have a focal length determined by the thickness of the lens element combined with a depth of the recessed surface as measured from a side of the lens element to the interlaced image. The lens element can be provided in a wrap around label attached to the side wall on both sides of the recessed surface.

6 Claims, 18 Drawing Sheets

LENTICULAR DISPLAY SYSTEM WITH A LENS SHEET SPACED APART FROM A PAIRED INTERLACED IMAGE

BACKGROUND OF THE INVENTION

1. Field of the Invention

The present invention relates, in general, to optical systems using lenticular lens materials or sheets to produce images and packaging useful for creating images, and, more particularly, to a packaging system or arrangement and method for producing images, such as 3-dimensional, colored images, with or without motion, inside or outside of containers or packages, e.g., packaging used in retail such as bottles, Jars, cups, boxes, and the like. The invention is also suited for use in large displays (i.e., lenticular-based display systems and methods) such as those provided on large glass windows, doors, or the like such as the cooler doors of stores selling refrigerated or frozen goods and in windows of stores and restaurants.

2. Relevant Background

In the competitive packaging and retailing industries (and especially, the beverage industry), marketing professionals and designers struggle to develop the individuality of their product. Most product differentiation is accomplished with the container and its packaging. In many cases, there is little difference between the contents and quality of two competing products. The differences are often ones of consumer perception of the products, and this difference in perception is created in part by advertising and marketing and, in large part, through creative packaging that leads to product identification and differentiation by package recognition and "shelf appeal." Studies have shown that a large percentage of purchasing decisions are made at the point of sale when a consumer is faced with numerous products arranged side-by-side and many final purchasing decisions are based on the attractiveness or distinctiveness of the packaged product or container. With this in mind, a great deal of time, effort, and money is spent on graphics, design, and presentation of the product container so that the product in its container stands out from other similar products on a shelf. For many products, the cost of packaging exceeds the cost of the actual product sold in the container or packaging.

As will be appreciated, there are significant ongoing efforts to create new and eye catching graphics in packaging to make each product appealing to consumers at the point of sale. In the packaging industry, there are a variety of techniques that can provide informational graphics as well as illustrative or "eye appeal" graphics that often include multi-color graphics or photographs. More elaborate graphics are sometimes produced with lenticular graphic labels using 3-dimensional (3D) and animation. Lenticular lens material is used in the packaging industry for creating promotional material with appealing graphics and typically involves producing a sheet of lenticular lens material made up of a layer of lenticular lenses and an interlaced image is printed on the back side of the lens layer. The lenticular lens material is then attached to a separately produced object for display.

The production of lenticular lenses is well known and described in detail in a number of U.S. patents, including U.S. Pat. No. 5,967,032 to Bravenec et al. In general, the production process includes selecting segments from visual images to create a desired visual effect and interlacing the segments (i.e., planning the layout of the numerous images). Lenticular lenses or lens sheets are then mapped to the interlaced or planned segments, and the lenticular lenses are fabricated according to this mapping. The lenticular lenses generally include a transparent web that has a flat side or layer and a side with optical ridges and grooves formed by lenticules (i.e., lenses) arranged side-by-side with the lenticules or optical ridges extending parallel to each other the length of the transparent web. To provide the unique visual effects, ink (e.g., four color ink) is applied to or printed directly on the flat side of the transparent web to form a thin ink layer, which is then viewable through the transparent web of optical ridges.

While these lenticular lens materials provide excellent visual effects, the use of adhesives and other attachment methods has not proven effective in producing high quality, long-lasting, and inexpensive plastic, glass, aluminum, and paper products. Because attaching the lenticular lens material after producing the container is inefficient and relatively expensive, the packaging industry is continually searching for methods for attaching the lenticular lens material to cups, bottles, and other containers or packages as part of the original manufacturing or packaging processes. As one example, the plastic manufacturing industry has only had limited success in overcoming the problems associated with using common lenticular lens material as part of standard plastic fabrication processes. The problems arise because plastic fabrication generally includes processes such as injection molding that involve heating raw plastic materials to a relatively high temperature (e.g., 400 to 500° F. or hotter) and then injecting the fluid plastic into a mold with the shape of the desired plastic object or by otherwise processing the molten plastic. The ink or ink layer has a chemistry that does not stay intact when the ink is heated to these high temperatures, and the image is destroyed or at least significantly altered.

Further, the use of these graphic techniques is often rejected by the retail industry due to its high cost per container. The lenticular lens labels are typically costly and are difficult to justify based on a cost-benefit analysis, e.g., the additional customer attention and increased sales are typically not offset by the reduced profit on each product sale. The challenge continues to be to create eye-catching graphics or packaging at a very low cost or even with a cost that is similar to packaging already used in present products.

There is a direct relationship in lenticular lenses between lens thicknesses and lenticules per inch (LPI) or frequency and the resulting amount and quantity of data and the overall graphic quality and effect achieved by the lenticular labels, which directly affects the label's cost and physical thickness. In other words, creating a desirable graphic is often a balancing act between adding data and increasing thickness of the lens and reducing material costs and label thicknesses. Similarly, a typical cost-cutting technique of container manufacturers is reducing the thickness or overall material used in the container and container walls. Some efforts have been made to utilize thin lens technologies to provide more data and enhanced graphics with less materials and reduced material costs, but the overall graphic effects have been only minimally successful with marginal quality and effectiveness.

In other efforts, wraparound labels have been developed that are capable of producing 2D and 3D images, e.g., images that "float" within a water or clear liquid bottle or that are visible on the back of a clear walled container when the contents have been emptied. For example, U.S. Pat. No. 6,943,953 to Raymond describes wraparound lenticular lenses for clear walled containers. As described, a wraparound label may be applied to a clear walled container (e.g., a water bottle) and the label includes a lenticular lens array that gets positioned on one side of the bottle while a printed image is provided on the opposite side of the bottle (e.g., is printed on the bottle outer surface or on the inner surface of the label). In this case, the lenses in the thin wraparound label focus through the container walls and through the interior space of the container. In other words, the focal length of the lens array is quite large, which allows relatively course lenses (e.g., lenticular lenses with relatively low lenticules per inch (LPI)). However, there are many packaging situations in which the contents of the container are not clear or the container walls themselves are not clear. In these situations, it is desirable to provide the printed image near the lenticular lenses such that the lenses do not have to focus through the container walls or container contents. Unfortunately, this again forces the packaging industry to face the issues involved with trying to produce eye-catching graphics with thin labels so as to avoid attaching thick and undesirable "slabs" of glass or plastic making up a thick lens on their products.

In this regard, it should be understood that lenticular graphics and printing require extreme accuracy in the printing registration and the fabrication of the lens array to produce a high quality image. Creating a quality image is much easier with a thick lens array (e.g., ⅛ inch or greater thicknesses) because the plastic or other material in the array allows the lenses of the array to focus on the backside of the lens array or layer or layer of plastic. The lens array can be course in this case such as 20 LPI which allows each frame and/or pixel in the image to be larger, thereby simplifying printing processes. However, these thick lens arrays are undesirable for a number of reasons including added material and fabrication costs, rigidness that makes it difficult to apply or "wrap" the lens array on a curved surface, and printing costs that significantly increased because the thick array does not lend itself to standard printing press processes (e.g., the interlaced image typically has to be applied via other more costly processes).

Due to the problems with thick lens material or arrays, the packaging industry continues to look for ways to utilize thinner materials that can be applied using standard processing techniques, such as those used to apply a label to a beverage bottle or other techniques now in use. For example, a standard plastic or paper label used for a glass or plastic water or beverage bottle may be only 1 to 3 mils thick (e.g., 1.35 to 2 mils is common) but can be applied to bottle very inexpensively. Thinner lenticular labels with lens on one side and an image on the other, though, have not been adopted because they are impractical in many cases as they provide very little material (e.g., plastic) for focusing when the printed image is provided on the back of the labels (e.g., printed on the back of the lens array). As a result, these lens arrays would have to be formed using very fine (or high density) lenses which causes the data space for a corresponding or registered image to be quite small causing the printing to be exponentially more difficult or nearly impossible with most existing printing equipment.

For example, a lens with a material thickness of 10 mils may need to be formed at 120 to 140 LPI to create a desirable, high quality image. This is a very fine lens array and forces very "thin" data spaces, which causes the image mathematics to be problematic. At this level, the resolution and the number of frames (e.g., for providing motion or other effects with multiple frames of a movie clip or the like) possible is also very limited (e.g., reducing quality of the produced image). For example, if it were desired to provide 20 frames of a movie clip to show action, each frame and pixel width would be about ½₈₀₀ of an inch in the interlaced image when the lenses in the array are provided at 140 LPI. Printing this type of image is extremely difficult. To provide a lenticular lens array on one side of a standard wraparound label (e.g., a plastic label having a thickness of about 1.35 to 2 mils) and an interlaced image on the back of the label, it has been estimated that the lenses would have to be provided at 400 to 600 LPI to achieve a desired image result, which result more limited data spacing and significantly more difficult printing mathematics and other issues.

Hence, there remains a need for packaging systems and methods that allow use of lenticular lens technologies in standard containers to produce enhanced graphic effects. Preferably such systems and methods would allow thin labels, such as standard wraparound labels, and existing (or only slightly modified) bottles and other packages to be utilized to create high quality, eye catching images.

SUMMARY OF THE INVENTION

The present invention addresses the above problems by providing packaged containers (or packaging systems) in which a focusing gap (or "air gap") is provided between a lenticular lens array and a corresponding interlaced image. The focusing gap is useful for allowing the focal length to be significantly larger without large increases in lens thicknesses, which is desirable to allow standard packaging processes, such as attaching of wrap around labels, to be used to apply the lenticular lens arrays. For example, some embodiments of the invention include a container with a recessed surface in its side wall. A wrap around label is then attached to the side wall of the container to produce enhanced graphics. The wrap around label includes an image portion or element that is attached to the container within the recessed surface. The label further includes a lens portion or element that includes a lenticular lens array (or set of lenses). The lens element or portion of the label is then applied to the side wall of the container so as to extend over the recessed surface and the previously positioned image element. In this manner, a gap filled with air (or other fluids) is formed between the lenses and the printed image such that focusing can be effectively achieved through the material and thickness of the lens element and air and size of the focusing gap. As a result much coarser lens arrays can be used with very thin labeling materials to achieve high quality graphics, e.g., 20 to 70 LPI (or coarser) lens arrays can be provided in 3 to 5 mil or thinner plastic sheets to achieve good imagery with an air gap of 0.5 inches or less (and often less than ³⁄₁₆ inch gap is utilized).

More particularly, a packaged container is provided that is adapted for producing a graphical image. The packaged container or system includes a container having a side wall defining an interior space and a surface recessed from the side wall such that the recessed surface is proximate to the interior space. An interlaced image is provided on the recessed surface, e.g., a series of slices or portions of one or more frames from a video, an animation, set of images, or the like. The packaged container further includes a lens element positioned on the side wall to extend across the recessed surface proximate to the printed image and to leave a gap (e.g., an "air gap") between the lens element and the interlaced image. The lens element includes a lenticular lens array having a plurality of lenses each having a focal point on or about the interlaced image. The lenses each have a focal length determined by the thickness of the lens element combined with a depth of the recessed surface as measured from a side of the lens element to the interlaced image. The depth of the recessed surface is typically greater than 4 mils but less than about 1.5 inches (e.g., about ¹⁄₁₀ to ³⁄₁₆ inch or the like). The lens element is generally formed from plastic with a thickness less than about 5 mils and often less than about 3 mils. For example, the thickness of the lens element may be less than about 10 mils and often less than about 3 mils. The plurality of lenses are provided in the lens element at less than about 60 lenses per inch (LPI) (such as 4 to 60 LPI and in some preferred cases around 20 LPI as higher lens frequencies sometimes require thicker lenses (such 18 mils to over 0.5 inches for 40 to 60 LPI lens arrays).

Further, the packaged container may be provided with the side wall having a circular cross section. The lens element in such embodiments can be provided in a wrap around label attached to the side wall on both sides of the recessed surface. The interlaced image may be printed on an image element that is wrapped about the side wall to contact the recessed surface. Further, the image element may be a unitary portion of the wrap around label, whereby the image element and the lens element can be attached to the side wall and the recessed surface in a single application process. The image element can have a width of about a width of the recessed surface and the lens element can have a width greater than the width of the recessed surface and a length greater than about the circumference of the sidewall adjacent to the recessed surface. The lenticular array can be formed in the wrap around label when the label material is planar (such as with embossing), and in these cases, the lenses preferably have radii adjusted for a drop off provided by a radius of the side wall adjacent the recessed surface. In some situations the wrap around label provides a sleeve with the wrap around label containing the lens element extending about the container to enclose the recessed surface.

According to another aspect of the invention, a method is provided for packaging a container adapted for producing graphical images. The method includes providing a container with a side wall having an interior surface defining an interior void. The side wall has a recessed surface offset by a pair of registration shoulders from the side wall by a depth toward the interior void. The method also includes providing a wrap around label made up of an image element and a lens element. The image element includes an interlaced image and has a width less than about a width of the recessed surface. The lens element includes a plurality of lenses and has a width greater than the width of the recessed surface. The packaging method includes attaching the wrap around label to an exterior surface of the side wall. Such attaching includes positioning the image element in the recessed surface with the image element positioned between the registration shoulders and also includes positioning the lens element on the side wall so as to contact portions of the exterior surface of the side wall adjacent the registration shoulders. In this manner, a focusing gap (or gap of air or "air gap") is formed between the lenses and the interlaced image.

During the attaching of the wrap around label, the plurality of lenses are positioned proximate to the interlaced image such that each of the plurality of lenses has a focal length equal to the focusing gap and a thickness of the lens element. The attaching of the wrap around label is in some embodiments a single rolling process. Also, in some embodiments, the lens element has a length greater than about the circumference of the sidewall at the contact portions to allow it to extend about the entire container and enclose the interlaced image. The lenses are provided in the lens element about the length of the lens element, whereby the image can be viewed up to 360 degrees or about the periphery of the container. In some cases, the lens element has a thickness of less than about 5 mils (such as 1.35 to 3 mils or the like) and the focusing gap is in the range of about 0.1 inches to about 0.5 inches.

According to another embodiment, a display assembly is provided for producing a graphical image that fills the focus or spatial gap with a solid such as the glass or plastic of an existing window or refrigeration unit or cooler door or other structure having a substantially clear portion. The assembly includes a rigid layer having a thickness of transparent material such as glass or plastic with a thickness of up to 0.125 inches or more. This thickness of transparent material defines or provides a spatial gap between a lens array and an interlaced image included in a lens element and an image element, respectfully. The lens element is attached to a first side of the rigid layer and is formed of a substantially transparent material in which the lens array of lenticules or lenses is formed. The image element is formed of a substantially transparent substrate upon which the interlaced image is printed. The image element is attached to a second side of the rigid layer opposite the lens element.

The lenses of the lens array are specially configured based on the refractive indices and thicknesses of the lens element, the material of the rigid layer, and the substrate of the image element to focus through the spatial gap and substrate onto the interlaced image rather than simply on the back of the lens element as in a conventional lenticular lens array (i.e., to have a focal point on or about the interlaced image). The lens element may be Formed of a thin plastic sheet (such as a static cling vinyl or the like) and the refractive indices may differ in the lens element and the material of the rigid layer. The radii of the lenses in the lens array are selected to account for the varying refractive indices to provide the desired focal length an or focal point. With the use of the spatial gap filler or rigid layer material the frequency of the lens array can be less than about 70 LPI such as 20 to 40 LPI to achieve effective graphics with a correspondingly designed interlaced image. Alignment is achieved in some cases by providing registration marks or elements on both the image element and the lens element (such as cross hairs or the like) that when overlapping or aligned provide assurance that the lens array is aligned with the interlaced image to map lenses to image segments. The lens assembly can be provided as a kit for fabricating a display on an existing window or door or the like. For example, a lens sheet may be provided along with an image element in such a kit with the lens sheet including a lens array configured for a particular window or door thickness and material and a corresponding interlaced image in the image element. In this way, the kit can be used to quickly create a lenticular-based display by applying the lens sheet to one side of a window or door and then applying the image element to the other side such as with adhesive layers or other mounting methods.

DETAILED DESCRIPTION OF THE PREFERRED EMBODIMENTS

Figure 1:
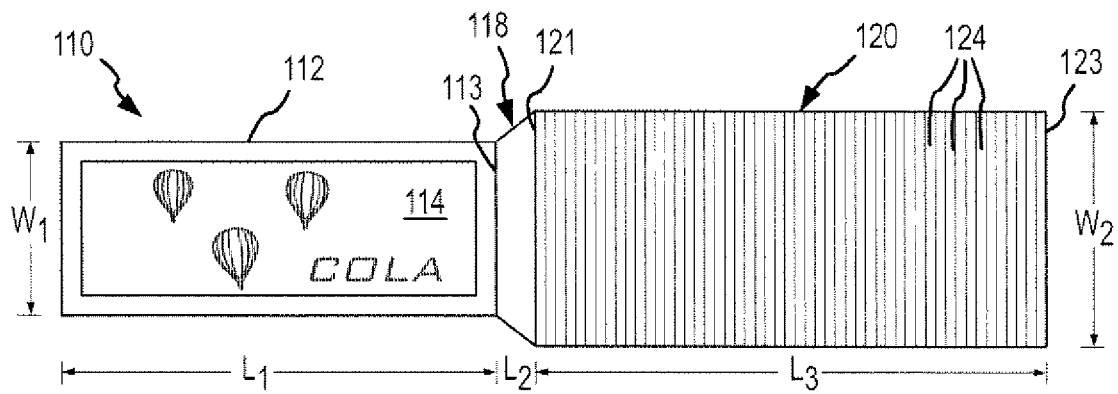
FIG. 1 is a plan view of a wraparound label illustrating a "T" shaped body with an image portion or element and a lenticular lens portion or element.

The present invention is directed to packaging systems and methods that include relatively coarse lenticular lens arrays (e.g., less than 70 LPI and more typically nearer 20 LPI) but yet achieve high quality imaging from interlaced images. This is achieved by providing the interlaced image on a first surface and providing the lenticules or lenses of the lens array on a second surface. The two surfaces are spaced apart by a focusing or spatial gap (or "air gap"). For example, a wrap-around label may be used that includes an image portion or element that is first wrapped about a container (e.g., a beverage bottle, a rectangular package, or the like) to position the printed image upon a recessed, registration surface. The label further includes a lens portion or element that is second wrapped about the periphery of the container outside the recessed surface so as to encapsulate the image element (or put a sleeve about the container) and, significantly, to create a gap between the image and lens portions. The two label portions may be provided in a contiguous or unitary label body having two widths that can be applied in a single "double wrapping" process or the portions may be provided in two separate labels applied in two steps.

As will be explained below in detail, the packaging techniques of the invention provide lenticules with focal lengths that can be much larger than standard thin lens arrangements that must focus through just the thickness of the lens material (e.g., plastic). In the described, packaging systems the lenticules are able to focus through air of the focusing/spatial gap onto a proximate or adjacent container surface on which the image has been printed or provide on previously applied label. The gap size or length may only be 0.005 to 0.5 inches or more but this added distance combined with the index of refraction of air allow significantly increase how "quickly" or over a relatively short distance that lenticules or lenses can be focused on an image (or portion of an interlaced image that is registered to a particular lenticule).

In other words, the air gap provided in the packaging systems allows graphic images to be generated at a much more reasonable LPI (lens coarseness or density) and printing/image mathematics and processes. For example, the printing may be done to support a coarse LPI such that 20 frames or images may be provided in an interlaced image to support a lens array with 20 LPI that is made of transparent plastic of about 1 to 3 mils thickness. In this case, the printing data spaces or slices would be around 1/400 of an inch, and this represents a 6 to 7 times increase in data space allowable for each slice or portion of a frame or image when compared with a plastic lens having a thickness of 10 mils attempting to focus on its back surface, which would require a 120 to 140 LPI lens array. The cost of many of the illustrated packaging systems is only a fraction of thick lens arrangements without air gaps, e.g., a 90 percent reduction in cost is expected in many cases as existing containers and wrapping devices may be used to apply the labels with little or no modification. The lenticular lens arrays of the invention can be applied readily to curved surfaces such as around an entire cylinder or rectangular object, which is often difficult with thicker lens sheets. Full animation and 3D) images can be produced without additional materials.

The following description stresses packaging systems that utilize plastic bottles with recessed, registration surfaces or shelves combined with one or two wraparound labels to provide the printed image so as to be spaced apart by a focusing or air cap from a lenticular lens array or plurality of lenticules or lenses. These embodiments are desirable because they lend themselves to existing labeling or packaging techniques such as roll labels and that type of equipment. However, the inventive techniques are also equally applicable to non-cylindrical containers and containers in which the recessed surface does not extend about the entire circumference or periphery of the container. Additionally, the techniques can be used in open ended containers or packages such as plastic cups such as those distributed at stadiums, concerts, movies, and the like. The packaging system of the invention provides improvements over prior techniques in that very thin labels may be used to provide the lenticules or lens arrays while not requiring that the container walls be clear or placing any limitations on the container contents (e.g., no requirement that the contents be clear or transparent to create desired images). The concepts of the invention are applicable to all containers or other surfaces upon which it may be desirable to provide imagery through a lenticular lens array and the surfaces or walls upon which it is provided may be formed from any number of materials such as plastic, glass, metal, paper, wood, or other materials while the lenses are typically formed from plastic or glass.

Figure 2:
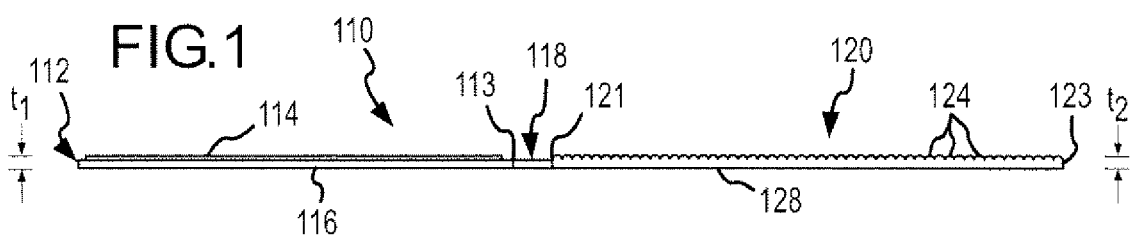
FIG. 2 is a side view of the label of FIG. 1 showing the interlaced image on a surface of the image portion and the plurality of lenticules or lenses on a surface of the lens portion.
Figure 4:
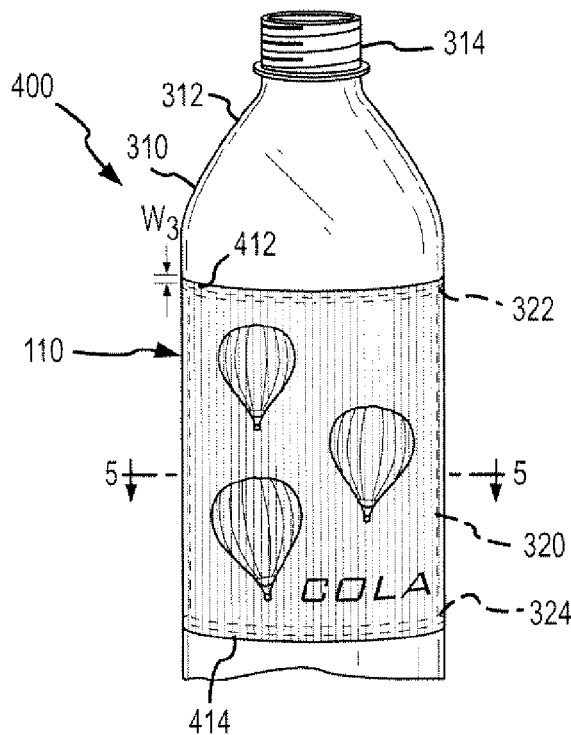
FIG. 4 illustrates a packaging system of the present invention including the container of FIG. 3 upon which the two-part, wraparound label of FIG. 1 has been attached (such as by adhesive) with the image portion contacting the recessed, registration surface and the lens portion enclosing the recessed surface and image portion by contacting surfaces of the wall 310 adjacent or proximate the recessed surface.
Figure 5:
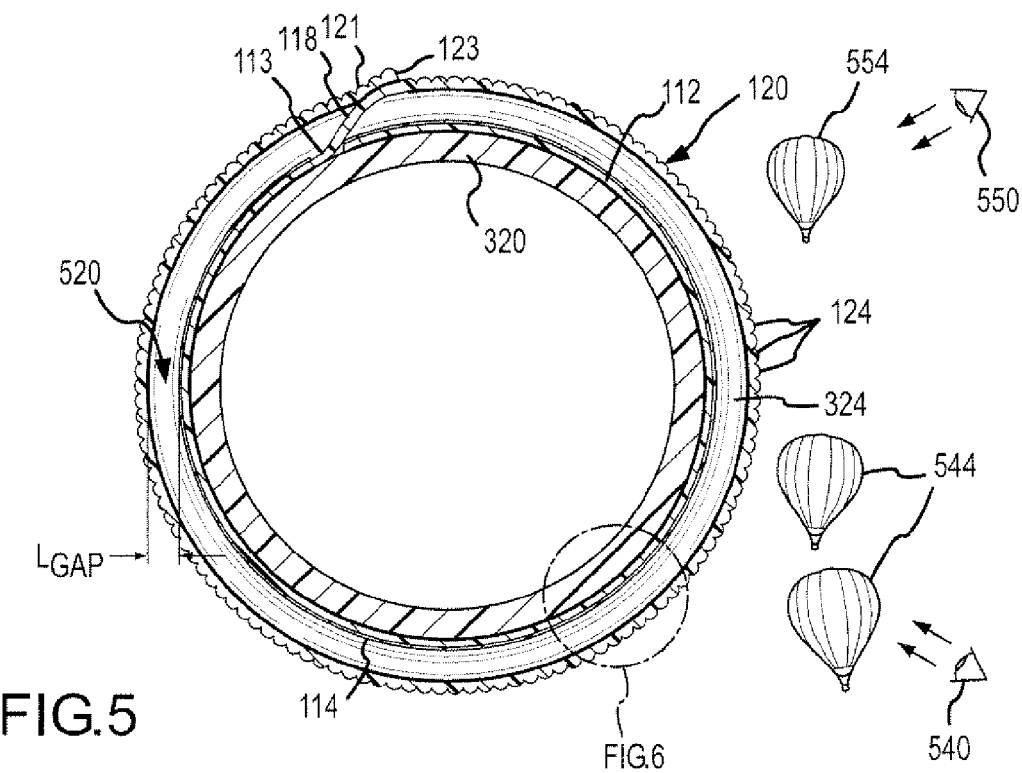
FIG. 5 is a cross section taken at line 5-5 of the packaging system of FIG. 4 illustrating in more detail the "double wrap" configuration in which the lens portion of the label acts as a sleeve for the container or bottle and a focusing or spatial gap (e.g., air gap) is formed between the printed image and the lenticules or lenses such that this gap matches or substantially matches the focal length of the lenses or lenticules.
Figure 6:
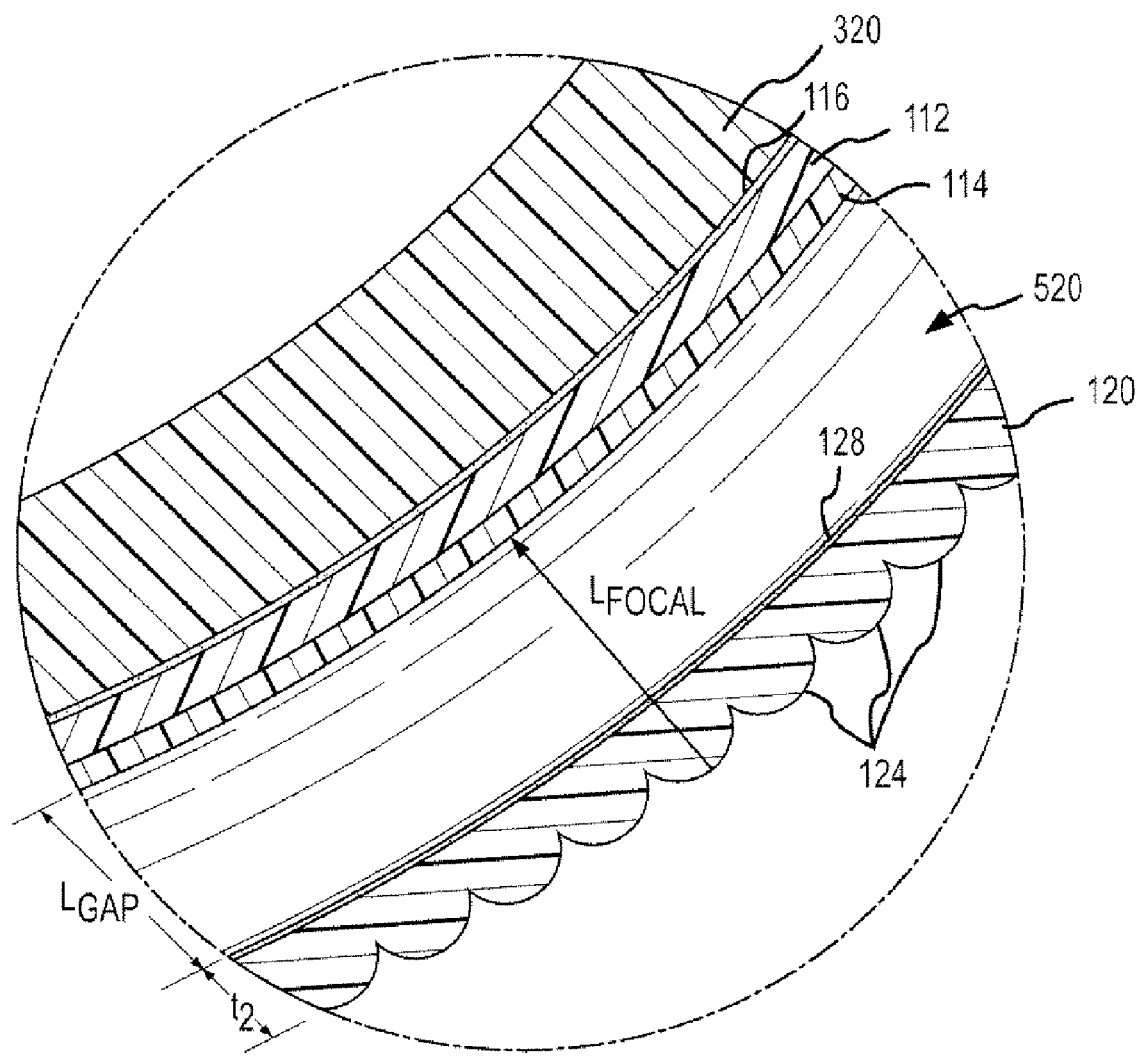
FIG. 6 is an enlarged view of a section of the cross sectional view of FIG. 5 showing in more detail the relative positioning of the image layer and image element body, the container wall, the lenticular lens element with its lenticules or lenses, and the air or spatial gap that is created or provide according to embodiments of the invention.

FIGS. 1 and 2 illustrate a wraparound label 110 formed for use in some embodiments of a packaging system (e.g., system 400 shown in FIGS. 4-6). The label 110 can be considered a two-part body (e.g., a T-shaped body) formed with an image element or portion 112 connected by a neck 118 to a lenticular lens element or portion 120. The label 110 may be formed from a single piece of material such as a plastic sheet or may be formed from two sheets that may be attached (such as by adhesive) at the neck 118, which may be useful to allow the elements 112 and 120 to made of differing materials or in different processes for later combination to form label 110. The image element 112 has an interlaced image (or printed image) 114 provided on one surface while a second opposite surface 116 is used for mating with a container and, particularly, with a recessed, registration surface. The image 114 is preferably configured to support the particular lens element 120 and the density or coarseness (or LPI) of lenses 124 provided on that element 120. Further, the image 114 mathematics will be selected based on the size of the air or focusing gap created in the packaging system (e.g., based on the gap length), with examples of specific embodiments and corresponding printing mathematics and/or algorithms provided with that discussion.

In some cases, the image element 112 is formed of paper materials as is the case with many existing container wraparound labels or is formed of other materials such as plastic. The image element is mated or attached to the neck 118 at an end 113 and has a thickness, $t_1$, that is typically very small such as less than 3 mils (but thicker elements 112 may be used in some cases). The element 112 has a width, $W_1$, that is typically selected to correspond with a width of a recessed, registration surface or shelf in the side of a container. In this manner, the positioning of the image element 112 and its image 114 can be consistently known and aligned or registered with the lens element 120 and its lenticules 124 (i.e., the lenticules of the element 120 can each be aligned or registered with image slices or portions in the image 114 when the label 110 is applied or wrapped onto a container). The image element 112 has a length, $L_1$, that typically is selected to be equal to or less than the peripheral dimension (e.g., circumference of $2\pi r$ for a cylindrical container, with r being the radius of the container at the recessed surface of the side wall), with one preferred embodiment having the element 112 wrapping about container at the recessed surface one complete time. In this embodiment, the image 114 may have a length that substantially matches the length of the element, $L_1$, to provide a 360 degree viewable image (e.g., when the lenses 124 or lens array is provided about the entire circumference of the container, too) or the length of the image 114 may be less than the entire element 112 (or the image 114 may not be continuous to provide images viewable in select portions of the container with lenses 124 being provided in a similar fashion or continuous even when the image 114 is discontinuous). In another embodiment, the element 112 only wraps about a portion of the container circumference such as half third, fourth, or the like to create an image viewable from a portion of the container and to reduce the cost and material for the label 110.

The wraparound label 110 includes a neck or connection element 118 for connecting the image element 112 to the lens element 1.20. The neck 118 may expand outward from the width of the image element 112 as shown to the width, $W_2$, of the lens element 120, or it may have the width of either element 112, 120 or a width between the two. The neck 118 may also be an integral part of either element 112, 120 (or of both in embodiments where the elements 112, 118, and 120 are formed from a single sheet of material) or a separate unit, and either or both of the elements 112, 120 may be attached such as with adhesive to the element 118. The neck 118 has a length $L_2$, that is generally selected to allow the neck to extend across a focus gap and often at a 45 degree or other angle formed as the label 110 is rolled or wrapped onto the exterior surfaces of a container (e.g., see FIG. 5 and the extension of neck 118 across air gap 520). The neck 118 is attached or mates with lens element 120 at end or side 121 of element 120, and this end 121 is typically the initial part of lens element 120 and label 110 to contact and/or be affixed to the container wall outside the recessed, registration surface.

The label 110 also includes the lens element 120 with its width, $W_2$, being selected to be wider than the image element (e.g., $W_2$ is greater than $W_1$) such that the lens element 120 extends across the width of recessed surface in the container and can be mounted (such as with adhesive) to the container wall. In a typical embodiment, the lens width, $W_2$, may be 0.25 to 1 inches wider (although other widths may be utilized) such that the lens element 120 can easily be attached with adhesive (or heat shrinking in some cases) and create an enclosure or sleeve about the recessed surface and the image element 112. In this way, a focusing gap that is typically filled with air (e.g., an "air gap") is formed in a packaging, system using the label 110. The length, $L_3$, of the lens element 120 (as measured from end 121 to end or side 123) may be equal or slightly larger than the circumference or peripheral dimensions of the container for the container side wall outside the recessed surface but typically adjacent or proximate to the surface.

The element 120 has a thickness, $t_2$, that is typically relatively thin and corresponds to more typical wraparound plastic labels, e.g., less than about 3 mils and preferably between about 1.3 and 2 mils, but thicker labels may be used to practice the invention such as thicknesses less than about 10 mils with cost and rigidness of the material being a likely limiting factor. Greater thicknesses may be desirable for creating certain graphical effects but in many cases it is more desirable to use standard clear plastic wrap sheets and its accepted thicknesses to allow the element 120 to be formed and applied using well known equipment, such as that used to apply roll labels. The image element 112 has a thickness, $t_1$, that is typically less than or equal to that of the lens element (e.g., $t_1$ is less than or equal to $t_2$) to control costs and increase the size of the created air gap (but, again, in some cases, $t_2$ may be less than $t_1$).

An array of lenticules 124 is formed on a first surface of the lens element 120. The lenticules 124 may extend "vertically" (e.g., transverse to a longitudinal axis of the label 110) or "horizontally" (e.g., parallel to a longitudinal axis of the label) depending on whether 3D effects are desired or whether color and animation are adequate, respectively. The lenticules 124 are formed integral with the body of the label 110 in element 120, typically in the same molding or other fabrication process and of the same material. The lenticules 124 are configured with numerous lenticules or lenses formed by ridges or ribs that extend parallel to each other. The lenticules of the lens array 120 are configured in frequency (lenticules per inch (LPI)) and shape (such as width and radius) based on the material and thickness of the element 120, based on size or length of the created air gap (e.g., based on the refractive index of air), and the curvature of the container wall to focus accurately on particular data element or slices of images in the interlaced image when the image 114 is positioned on a recessed surface of a container but spaced apart by the air gap from the lens element 120.

For example, the lenses 124 may be provided with a coarseness or frequency of 10 to 70 or more LPI and more preferably in the range of 15 to 35, with a 20 LPI frequency being used in some preferred embodiments. The space or distance provided by the air gap and the refractive index of air allows a coarser configuration for lens array 124 to be used while still providing a large quantity of data in the printed image 114. The array of lenticules 124 can have a wide variety of dimensions (such as a height and "width") selected based on the size of the container and its recessed surface and the size of the printed image 114 and shapes (such as a square, a rectangular, a triangle, a circle, an oval, or any other useful shape for viewing the image 114). The fabrication of standard lenticular material sheets is well known by those skilled in the printing arts and such knowledge may be utilized at least in part in designing the molding or arrangement of the lenticular lenses on the wraparound label 110 in lens element 120. For example, lenticular material fabrication is described in U.S. Pat. No. 5,967,032 to Bravenec et al. and U.S. Pat. No. 5,753,344 to Jacobsen, which are incorporated herein by reference.

Typically, the label 110 and, particularly, the lens element 120, are fabricated from a very thin sheet of clear plastic to minimize distortion through the lenticules 124. The lenticules 124 make up a lenticular lens array and include a plurality of optical ridges or lenses (which may extend vertically as shown or horizontally on the element 120) and a transparent lens layer or web that provides a relatively smooth, contact surface 128 for contacting the container exterior surfaces in this embodiment and for facing inward into an air space or gap. Fabrication of such lens arrays may be performed by well known techniques and preferably is performed to account for the shape of the container and the forming of lenticules on a flat surface that will later be mounted on a curved surface (e.g., including using the mathematical algorithms discussed later in this description). For example, the techniques used to produce the label 120 may include beginning with a sheet or portion of a sheet of clear label wrap or material for wrapping on a container (such as that used presently with water or beverage bottles). The wrap is processed by printing the image 114 on image element 112 and embossing the lenses 124 on lens element 120 in line or in separate processes. In some cases, a printing press is used to print with flexography inks the image 114 and is also used to emboss the top of the lens element 120 to form the lenticules/lenses 124 using a heated or unheated pressure roller. A lens embossing station may alternatively be provided down (or up) line from the printing press with dies selected to form the lenses 124 in element 120, which typically would be formed of plastic (such as polypropylene or the like). The lenses 124 may also be embossed or spot embossed or extruded prior to the printing of the image 114 and/or attaching of image element 112. The lenses 124 (or an array of such lenticules/lenses) may extend to the edges of the element 120 or may a frame without such lenses 124 may be provided (such as to the sections attached to attachment portions 412, 414 of side wall 310 as discussed below) or the lenses 124 may be provided only in sections (or discontinuously) on element 120 to be paired with images provide in a similar manner in image 114.

There are a number of processes that may be used to form labels, such as label 110, to practice the present invention. The following describes one exemplary fabrication technique for a two piece label (e.g., in which the lens and image elements are joined), which those skilled in the art will recognized can be modified without deviating from the breadth of the description, and, particularly, the specific materials and dimensions are provided as examples only and not as limitations. In one embodiment, the process begins with selecting or providing a clear film with a thickness of 50-gauge to 2-mil and a material of cast propylene, OPP, polyester, PETG, or other useful material. The film is printed with one or more interlaced images on either side (e.g., its front or back/reverse surface), e.g., a number of images may be printed to use the sheet for forming a like number of wrap around labels. The film is then laminated with another clear film of identical thickness, smaller thickness, or greater thickness, which is used for forming the lens element. For example, the base or image element film may be 70 gauge (i.e., 0.70 mils) and the secondary or lens element film is also 70 gauge. An "adhesive" layer or connector element between the two films may be a low density extruded polyethylene that is sandwiched between the two films to connect them. Though it is typically preferred for processing efficiencies and waste minimization to print the single layer of based films prior to laminating, the printing tray be performed after the lamination or connection step to the two piece label. After the printed film is laminated to the extruded poly material in a thickness of 0.5 mils to several mils thick (with some embodiments using thickness of up to or over 10 mils but, more typically 2 to 3 mils or less is used), the total construction thickness of the film is about 3 to 4 mils thick.

The combined sheets or material is then taken to a process in which the center between each label (e.g., usually the labels are printed at about 3 inches wide in forming labels for bottles or similar containers) in a roll that may be, for example, 50 to 60 inches wide (e.g., with about 20 labels across its width) is cut out and "stripped" or rolled up to be thrown out accommodating the die cut for the "T" shape (e.g., see, FIG. 1). During the same process, an "emboss" that is the lenses (or lens array) for the lenticular or lens element of the label is embossed in the film on the secondary or lens element portion of the film. This embossing is performed so as to register the second layer or overlap that becomes the lens when the label is installed to the printed image (see, for example FIGS. 1-5). Generally, this emboss is done in "spot" style and not in the whole label. The embossed lens can be formed in at least three ways: a cold emboss, a heat emboss, and a pre-heat emboss (which is preferred in some cases) followed by a chill roller in which the pattern of the lenses is embossed into the film and "chilled." into place. In these embossing processes, it is important to note that the "lenses" that are formed into the film preferably correspond mathematically to the interlaced graphic already printed on the label substrate or film. This array of lenses also should be aligned and preferably perfectly aligned to the printed image and be engineered for the circumference (or lack thereof for flat surfaces) of the container wall, as is explained in more detail below.

With the labels formed, the packaging process continues generally with each container to be packaged being first wrapped into a recessed surface in an automated process with the graphic or image element portion of the label. The wrapping continues with the application of the lens portion of the label that goes onto the container adjacent to the recessed surface in a secondary wrap (with the whole wrap being one piece in this example, although this is not necessary to practice the invention) to form a spatial or focusing gap between the two label portions. The lens portion of the label is lined up and aligned with the graphics or printed image, and in some cases, this allows 3D and animation effects to be maintained and effectively provided with a spatial gap. Correct mathematical pitch of the lenses and the interlace image is maintained to assure animation continues to work properly, and the lenses and image are also configured or set for the particular viewing distance of the packaged container or object.

More specifically, the wrapping process may include a container being placed onto a machine and then being wrapped twice in a "tack and wrap" system. In this system, the first and often thinner image portion of the label is wrapped around the container into recessed surface or space engineered for or provided for the narrower portion of the label (e.g., see FIG. 1). The second layer or lens element of the label is wrapped or completed on the second revolution of the container, which takes the wider portion of the label and places it onto a registration shoulder or greater diameter portion of the container adjacent the recessed surface. This double wrapping creates an air gap of known depth or length between the graphic or printed image/container and the lenses that preferably corresponds with the focal length of the lenses to enable the lenses to accurately focus on the interlaced graphic. The focal length is determined by calculating the refractive indexes of the lens element portion of the label and air and the corresponding thickness of the lens element portion of the label and length of the gap, and then combining them. One idea or theory behind this wrapping technique is to create a focal length that is more forgiving for courser lens arrays, e.g., lower LPI, to increase the ease of printing, to provide greater data space in the image, and generate enhanced graphic effects.

Figure 3:
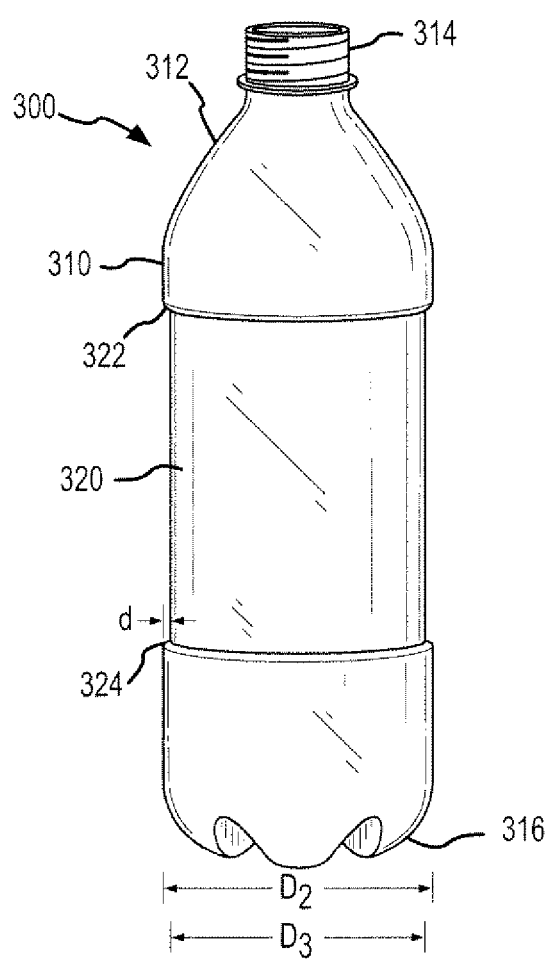
FIG. 3 is side view of a container (e.g., a bottle) with a recessed, registration surface in its side wall.

FIG. 3 illustrates a container 300 upon which the label 110 may be applied in a packaging system (e.g., packaged container or packaging system 400 of FIGS. 4 and 5). The use of a spatial gap to provide a focusing length that includes focusing through air, other gases, or liquid is useful with a variety of container shapes and wall materials (e.g., not limited to plastic or glass but is also useful with metal, cardboard, and other materials used for packaging of goods). Hence, the container 300 is not meant as a limiting embodiment but, instead, is an exemplary embodiment for the general concepts of the invention.

As shown, the container 300, which may be thought of as a plastic or glass beverage or other product bottle, jar, or the like, includes a side wall 310 that defines its generally cylindrical shape. As shown, the container 300 is provided with a relatively standard shape utilized for typical plastic bottles used for distributing water or other beverages, and in other cases, the container 300 is preferably modified to include such a recessed surface 320. As such the container 300 includes a clear or translucent or opaque container wall 310 having a substantially cylindrical shape for containing liquid. The container wall 310 is typically formed of glass or more typically of a plastic such as polyvinyl chloride (PVC), polypropylene, polyethylene, polyester (such as PET, APET, PETG, and the like) or other plastic used by the packaging or container industry. The container 300 may be formed by blow molding, injection molding, or any other technique useful for producing containers and adapted (as necessary) for the glass or plastic material used to fabricate the container 300.

The sidewall 310 abuts a shoulder 312 that is connected to opening or neck 314, and the exterior further includes a bottom or bottom wall 316 enclosing the container 300. Significant to the present invention, the side wall 310 includes a recessed, registration surface 320 extending about the circumference or periphery of the container 300. The recessed surface 320 has a diameter, $D_2$, that is less than the diameter, $D_1$, of the adjacent portions of the container 300 as defined by the side wall 310 (i.e., the diameter, $D_1$, of the container at the recessed surface 320 is reduced by two times the depth, d, of the recessed surface 320 relative to the side wall 310). The depth, d, is established by upper and lower shoulders or shelves 322, 324, which are shown to be the same size in this embodiment but in some cases there will be a first and second depth associated with the shelves 322, 324 (e.g., the container 300 may be smaller towards its neck 314 than near the bottom wall 316) and such cases are within the breadth of this invention. The depth, d, is significant to the invention as it defines (along with the thickness of the image element 112) the size or length of a focusing or air gap that is created when the label 110 is applied to the container 300.

The recessed, registration surface 320 has a width, $W_3$, as measured between the shelves 322, 324. It is useful for the image element 112 and its image 114 to be in a known or registered portion of the container 300 to facilitate registration of the lenses 124 with the image 114. To this end, the width, $W_3$, is preferably about the width, $W_1$, of the image element 112 such that the edges of the image element abut the shelves 322, 324. In other embodiments, though, the image element 112 is thinner than the recessed surface 320 and registration is controlled by application processes used to apply the label 110 to the container 300. As discussed above, the width, $W_2$, of the lens element 120 is greater than the width, $W_3$, of the recessed, registration surface 320 such that when the label 110 is applied the lens element 120 is positioned so as to span over the surface 320 and contact at least a portion of the sidewall 310 on each side of the surface 320 (e.g., side wall 310 adjacent or proximate to shelves 322, 324), whereby the focusing or air gap is formed.

FIG. 4 illustrates a packaged container or packaging system 400 according to one embodiment of the invention. The system 400 includes the container 300 with the label 110 attached to the outer surfaces of the side wall 310. As shown, a graphical image is visible from the exterior of the container, and, as will be explained, the label 110 is applied such that the focal point of the lenses 124 is on or proximate (e.g., accounting for the thickness, $t_1$, of the image element 112) to the recessed surface 320 so as to focus on the image 114. In other words, the focal length of each lens 124 is selected to be through the lens element 120 (e.g., its thickness and accounting for its material and refractive index) and through the air in the focusing gap created between the web or back surface 128 of the lens element 120 and the image 114 on the image element 112 of the label 110.

With reference also to FIG. 5, the label 110 is typically applied to the container side wall 310 using standard application practices such as heat shrinking and more preferably rolling processes with adhesives (e.g., hot glue). It will be understood that the cross sectional view of FIG. 5 and in other figures (such as FIG. 7) is not to scale with the bottle or container 300 shown smaller relative to the thicknesses of the wraparound label 110 and the achieved air gap such that the various very thin layers can be visualized with their relation to each other being shown.

The application process may be thought of as a single process or single roll that involves a "double wrap." Specifically, in one embodiment, a first end of the image element 112 is applied to a starting or initiation point on the recessed surface 320 between the registration shelves 322, 324, such as with adhesive (not shown) applied to the contact surface 116 which is placed in contact with the surface 320. Rolling of the label 110 onto the container 300 thus begins with application of the image element 112 with the image 114 facing outward from the container side wall 310. In the illustrated embodiment, the image 114 is printed or applied onto the same side of the label 110 as the lenses 124, but, in some embodiments, the image 114 is applied to the back side 116 of the label 110 so as to provide additional focusing space and materials (e.g., when the image element body is formed also of clear plastic or the like rather than a nontransparent paper or other material).

Application of the label 1110 continues until the lens element 112 is placed fully against the recessed surface 320, with additional adhesive sometimes being applied during such application or at least at or near the end 113 such that image element 112 is retained in position against the recessed surface 320. With the image element 112 in place, the rolling or application of the label 110 continues with the neck or extension portion 118 extending outward from the recessed surface 320 across the depth, d, to the shelves 322, 324. Then, the lens element 120 contacts the sidewall adjacent the recessed surface 320 at attachment surfaces 412, 414 of side wall 310. As shown, only a relatively small portion of the lens element 120 abuts the surfaces 412, 414 (such as 0.125 to 0.5 inch or more on each side of the recessed surface 320). The rolling or application continues with the lens element 120 being attached, e.g., glued or the like, to the surfaces 412, 414 of the side wall 310 until it has been fully applied. At this point, the end 123 of the lens element 120 may be further attached to the container side wall 310 and/or to itself. Typically, the length, $L_3$, of the lens element 120 is such that it will extend about the container side wall 310 at least once so as to fully enclose the image element 112 and recessed surface 320 (although this is not a requirement to practice the invention).

As shown in FIG. 5, the application of the label 110 in this manner results in a focusing or spatial gap 520 being created between the lens element 120 and the image element 112. In the illustrated embodiment, the length of this gap, LEAP, is measured from the back surface or web 128 of the lens element 120 to the image 114 on the image element 112. This distance can typically be approximated as being equal to or slightly less than the depth, d, of the recessed surface 320 minus the thickness, $t_1$, of the image element 112. In standard manufacturing processes (such as typical application of a wrap around label onto a bottle or container), the gap 520 is filled with air. Hence, determination of the proper shape and configuration for the lenses 124 and their frequency (e.g., LPI) takes into account focusing through a thickness of air equal to the gap length, $L_{GAP}$, rather than just the thickness, $t_2$, of the lens element.

As discussed in detail above, this is very beneficial for achieving high quality graphics with relatively coarse or lower frequency lens arrays. For example, in some embodiments, the thickness, $t_2$, can be kept below about 3 mils (or use standard wrap around materials and sheet thicknesses), the lenses 124 can be provided at less than 40 LPI (such as at 15 to 25 LPI), and the image 114 can be interlaced with 20 or more frames or images (at 1/400 of an inch spacing or slices) that can be registered to the lenses 124 when an air gap or spacing thickness of 0.25 inches or less is achieved in the packaging system 400. In one embodiment, 20 LPI was used by the inventor to produce high quality graphics with 20 images when a 3/16-inch LPI was provided in a packaged container 400.

As shown, a viewer 540, 550 can view images 544, 554 through the lenses 124 at various points about the container package 400. Specifically, the images 544, 554 are viewable where the lenses 124 are provided and paired with images 114. In the illustrated embodiment, this is between 300 and 360 degrees (e.g., nearly about the entire circumference of the container 300). In other embodiments, the images 544, 554 may only be visible for a portion of the circumference, such as for a front portion or from particular locations such as the front and back. In this latter arrangement, the image 114 may be provided in select locations of image element 112 and similarly, the lenses 124 may be provided in only select portions of the lens element 120 that can be paired with these image sections 114 or so as to be available about the entire circumference or periphery of the container 300 as shown. Also, as shown, the images 544, 554 may be projected outward from the container package 400 to provide a 3D effect. The images 544, 554 may also be provided with motion by rotating the container package 400 and be combined with images (such as the product logos and the like shown in FIG. 4) that are background and appear to be at 112 or between 112 and images 544, 554. In addition to floating or projected images and images at the label location, the lenses 124 and image element 112 may be configured such that images appear to be inside the container or otherwise behind the image element 112 or container recessed surface.

FIG. 6 provides an enlarged view of the various components and/or layers of the packaging system 400. As shown, the container wall 320 mates (such as with adhesive or shrink fitting) with the contact or inner surface 116 of the image element 112 (or element 112 body), and, typically, there is little or no gap or spacing between these surfaces (except some air pocketing that may occur in standard labeling processes). The interlaced or printed image 114 is provided on the opposite surface of the image element 112. A spatial or focusing gap 520 is provided that is typically filled with air (but other gases or fluids may be provided in such gap 520 to achieve a specific effect or to obtain a desired index of refraction). The gap 520 has a size or length, $L_{GAP}$, that is measured from the web or back surface 128 of lens element 120 to the printed image 1114 (or, more simplistically, to surface of element 112). In one example, the thickness, $t_2$, of the lens element 120 is less than 5 mils and more preferably between about 1.3 and 2 mils, and the gap length, $L_{GAP}$, is less than about 5/16-inch (with one embodiment being less than 3/16-inch). The focal length, $L_{FOCAL}$, is the sum of these two dimensions, which is typically much larger than could be obtained with just the use of a plastic wrap as stiffness, cost, and fabrication issues would make such thickness impractical.

It is important that the lenses 124 be registered with particular portions of the image 114 and typically that they either be substantially parallel to these slices or portions of the image 114 or be substantially perpendicular. Generally, this is achieved by the proper selection of the lengths of the elements 112, 118, and 120 (e.g., $L_1$, $L_2$, and $L_3$) for a particular container 300 and its diameters, $D_1$ and $D_2$ such that when the label 110 is applied as shown in FIGS. 4-6 the lenses 124 are properly aligned with the image 114. Further, in this regard, some embodiments of the packaging system 400 include grooves or slight shoulders (not shown) as part of the attachment surfaces 412, 414 on the side wall 310 to assist in proper placement and alignment of the label 110 as it is attached to the container side wall 310. Of course, some lack of alignment may be acceptable with the quality of the images 544, 554 being improved with higher accuracy alignment or registration.

FIGS. 1-6 illustrate an embodiment for creating an air gap 520 with a single wrapping process. In other embodiments, an air gap or focusing gap filled with air is formed with separate applications of an image element and of a lenticular lens array or lens element. For example, the packaging system 400 may be modified such that the image 114 is applied directly onto the container surface 320, e.g., is printed onto the side wall directly without a label or is provided as part of the wall (e.g., during manufacture of the container 300 an interlaced image may be printed or otherwise formed/provided on either the outer or inner surface of the side wall 310 or even within the side wall 310 at surface 320. Such embodiments are considered within the breadth of this description as they are packaging systems or packaged containers/devices in which a gap filled with air or other fluid is provided by the application of a lenticular lens label or a wrap around label, whereby coarser or lower frequency lens arrays may be used to achieve results similar to that achievable with much thicker lens elements and/or much higher frequency arrays (with corresponding much more challenging printing mathematics and processes).

Figure 7:
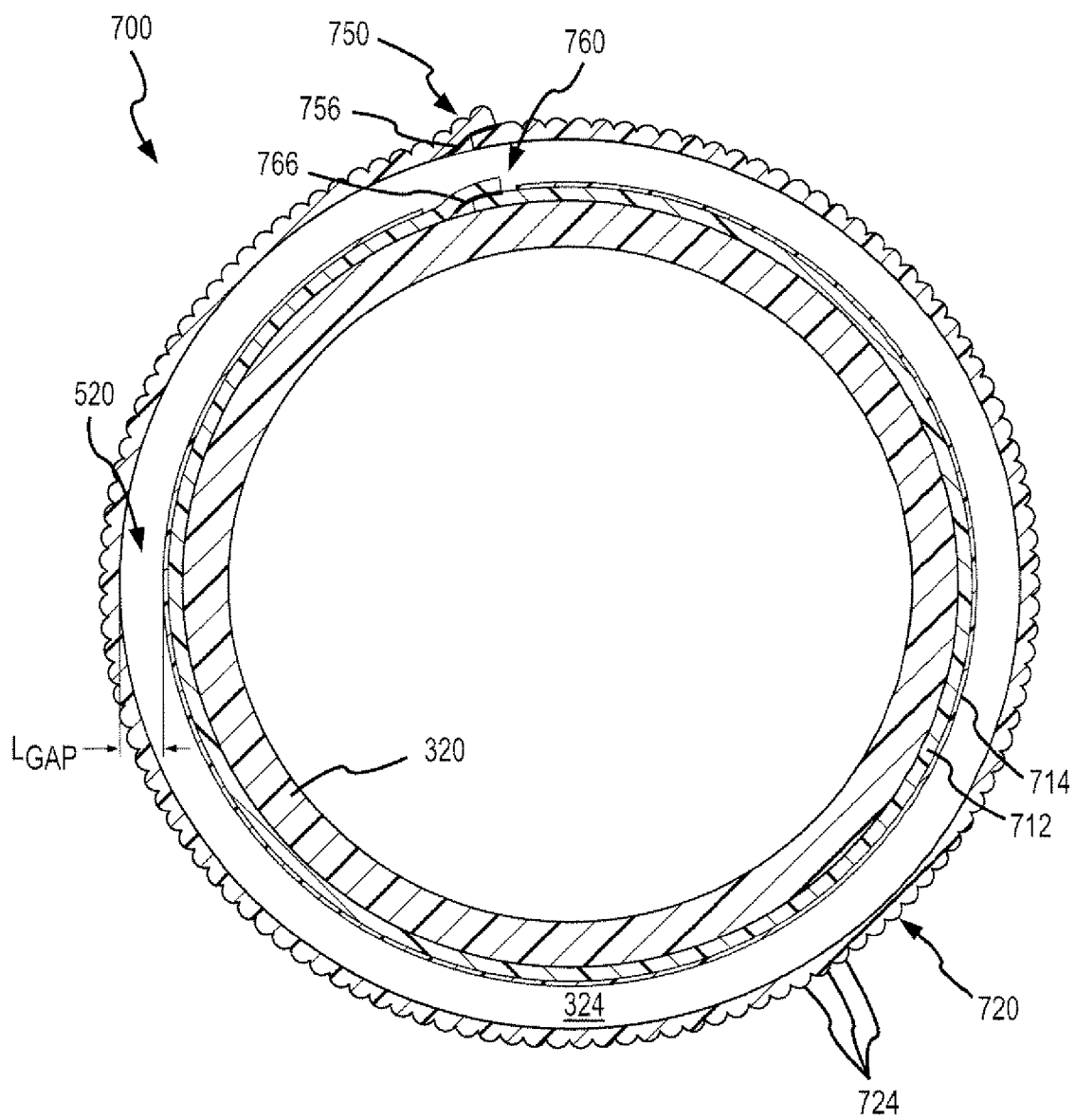
FIG. 7 is a cross section view similar to that of FIG. 5 showing an alternative packaging system in which two separate labels are applied to provide the image element and the lenticular lens array.

FIG. 7 illustrates another packaging system or packaged container 700 according to the invention. In the system 700, a container (such as a container 300 or a cup or other cylindrical cross section container) is wrapped to form an air space 520. As shown in a similar fashion to FIG. 5, a container side wall 320 with a registration shelf 324 is provided to define recessed surface (such as surface 320). The air space 520 in contrast to the system 400 is formed by two individual wraps or wraparound labels that are applied in two processes or sequentially on a single line. An inner wraparound label 712, e.g., an image element, is provided with an interlaced or printed image 714. The image element 712 is applied by attaching a first end, such as with adhesive, and wrapping the element 712 about the recessed surface of wall 320. The wrap or element 712 may have a length such that it extends around the wall 320 at the recessed surface slightly more than one time such that an overlap section 760 may be attached, such as with adhesive, to the top or image side 714 of the image element 712 to tightly bind the element 712 to the recessed surface of wall 320.

An outer or lens element (or wrap or wrap around label) 720 is provided in the system 700 to form the focusing gap 520. The lens element 720 is attached to the wall 320 at its larger diameter portion that is adjacent to the recessed surface defined by the shelf 324 (and shelf 322 not shown in FIG. 7). The lens element 720 may be configured similarly to element 120 and includes a lens array or plurality of lenticules or lenses 724. The lens element 720 is applied or attached to the wall 320 such that the lenticules 720 are on the exterior of the packaged container 700 and such that the line of focus is inward to a focal point on or near the printed image 714 through the air or fluid in gap 520. As with the lens element or wrap 712, the lens element or wrap 720 may be provided with a length that is somewhat larger than the circumference or periphery such that it has an overlap portion 750 that can be attached to the lens side (or over lenticules 724 in some cases) with adhesive 756.

The embodiments of packaging systems 400 and 700 are shown to include recessed surfaces and labels that extend about the entire circumference or periphery of the container 300. In some embodiments of the invention, it may be desirable that one or the other of these components does not extend about the entire circumference or periphery. For example, it may be useful to only provide the image element and/or lenticular array in a portion of the container, such as in the front (or side presented to consumers when the device is shelved for sale) even though the recessed surface extends about the entire circumference or periphery.

Figure 8:
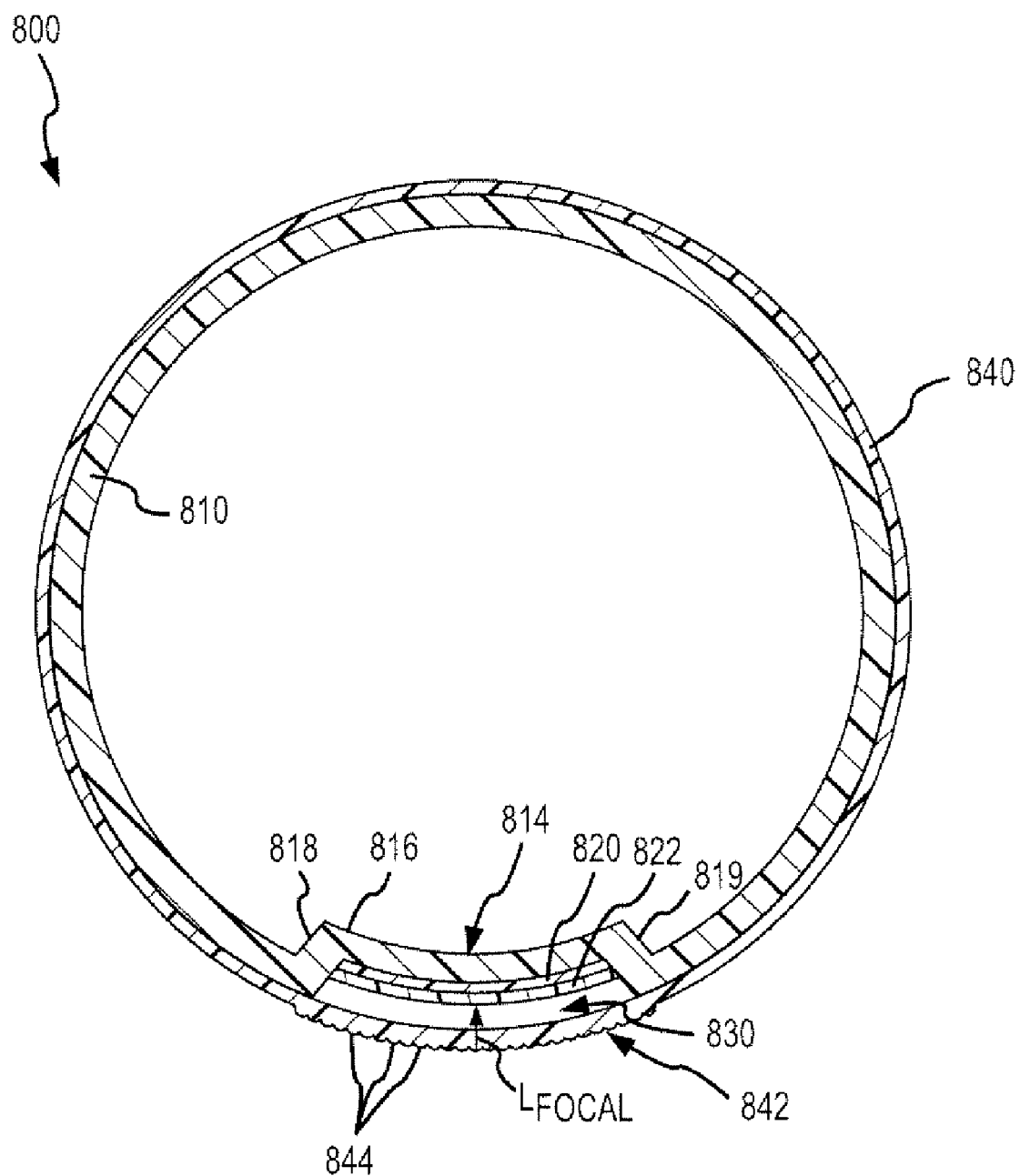
FIG. 8 is a cross section view similar to FIGS. 5 and 7 showing another alternative packaging system of the invention in which the recessed, registration surface does not extend about the entire periphery or circumference of the container (and, in the illustrated embodiment, neither does the lenticular array or set of lenticules)

Alternatively, the packaged container or packaging system 800 of FIG. 8 may be utilized to create a desired graphical image. This container having the side wall 810 may be a bottle as provided for container 300 or may be a cup (such as a stadium cup) or other cylindrical container. The side wall 810 includes a recessed surface 814 that may extend the length of the container wall 810 or more typically is provided in a portion of the wall 810. For example, in a container wall 810, the recessed surface 814 may be a 3-inch by 4-inch rectangle, a 2-inch square, a 3-inch diameter, or other shape with a surface area that is selected to suit the size of the wall 810 (e.g., the diameter of the container with wall 810) and the size of the image being displayed or created by the system 800. The size, number, shape, location, and depth of the recessed surfaces 814 may be varied to practice the invention.

As shown, a single rectangular or square recessed surface 814 is provided in the container wall 810 of system 800. The recessed surface 814 is defined by side walls 818, 819 (with top and bottom side walls not being shown in FIG. 8) and back or interior wall 816. Such a recessed surface 814 is typically formed at the same time as wall 810 such as during the blow molding or other manufacturing process. In other cases the recessed surface may be cut or otherwise formed in wall 810 such as by having the depth of surface 814 being only a fraction of the thickness of sidewall 810. A printed image is then either formed directly in the recessed surface, or as is shown, an image element or label may be provided and affixed (such as with adhesive) to the recessed surface 814. The image element may include a substrate 820 (such as a paper material or plastic or the like) and an interlaced printed image 822 (e.g., a layer of ink). A wraparound label 840 is then applied to the container wall 810 so as to position a lenticular array 842 with a plurality of lenticules 844 adjacent or proximate the image 822 but spaced apart by a focusing gap 830, which may be filled with air or other gas/fluid.

The lenticules 844 may be at a lower frequency than if the gap 830 were not provide with the focal length, $L_{FOCAL}$, being the thickness of the wrap 840 or more specifically of the wrap at the lenticular array 842 combined with the length or size of the gap 830. For selecting the frequency (e.g., 10 to 50 LPI or more or less coarse) and configuration of the lenticules 844, the thickness of the array 842 and its material would be taken into account along with the radius (or curvature) of the container wall 810 at the application of the array 842 and further along with the index of refraction of the fluid in the gap 830 (e.g., the index of refraction of air or other gas). With the system 800, a graphical image (not shown) can be created relative to a portion of the container wall 310 with relatively coarse lens and thin wrap 840.

Figure 9:
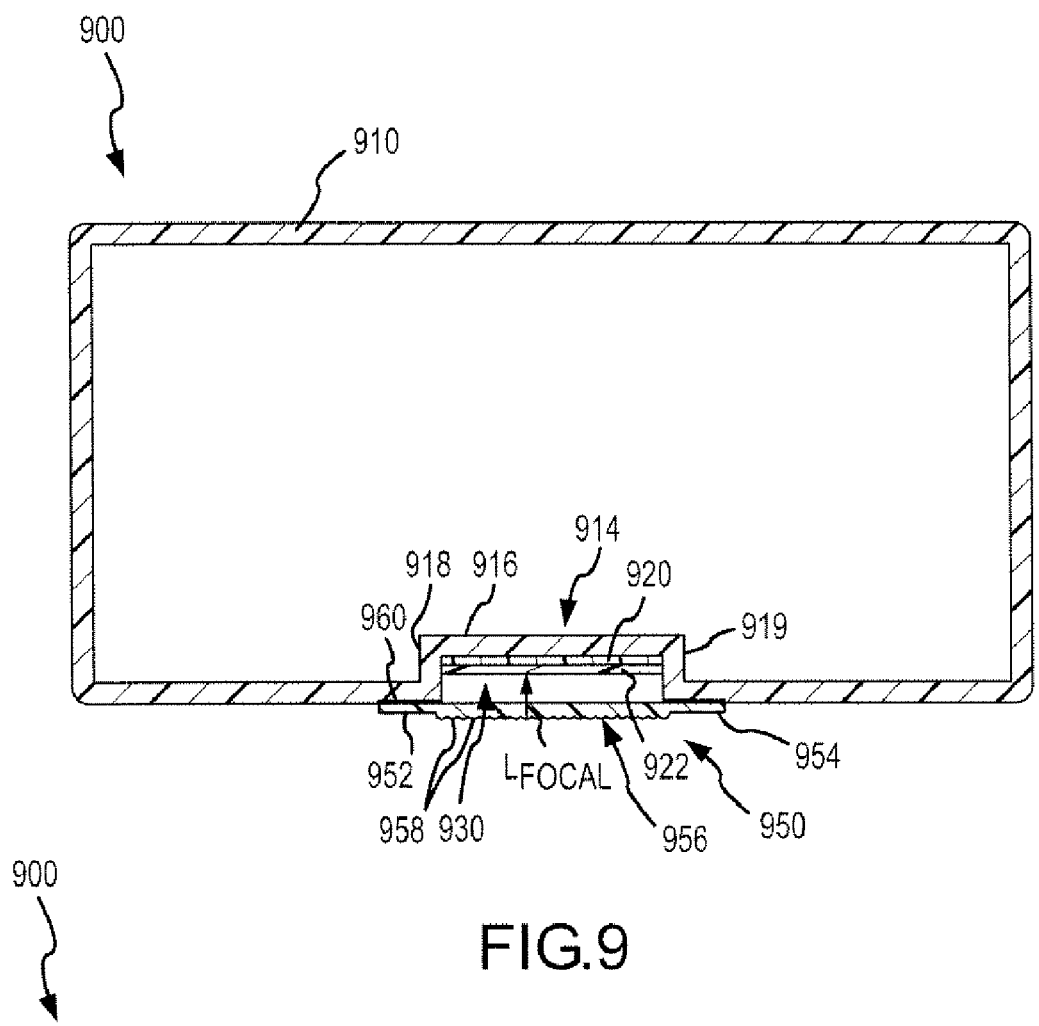
FIG. 9 is a cross section view similar that of FIG. 8 showing packaging system in which the container has a rectangular cross section and the lenticular lens array is provided in a label that does not extend about the container but instead extends over the recessed, registration surface.
Figure 10:
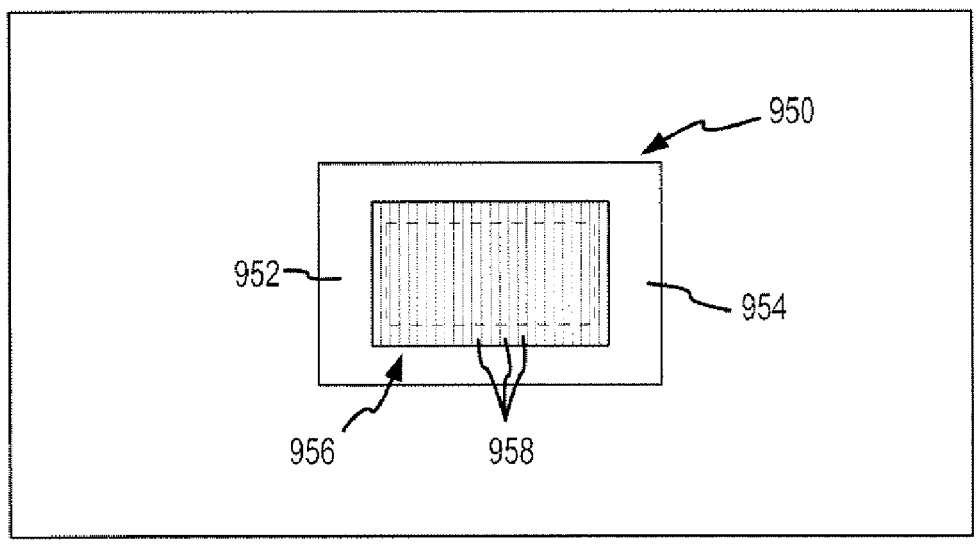
FIG. 10 is a top view of the packaging system of FIG. 9.

Of course, the inventive concepts may be used in containers with a cross section that is not circular. For example, a container that is square, hexagonal, triangular, or other polygonal cross sectional shape may be enhanced by the inclusion of the packaging shown herein. In general, nearly any surface may be modified to include a recessed surface for holding an image element (or just an interlaced image that may be printed directly or otherwise provided within the recessed surface) and a lenticular array or label with a set of lenticules may be positioned over the recessed surface and a corresponding image. FIGS. 9 and 10 are useful for showing another embodiment 900 of a packaged container that has a container wall 910 that is rectangular in cross section. The embodiment 900 is also different from the others shown as the lens element or label 950 does not extend about the entire periphery of the container wall 910. Instead, the lens element 950 is only slightly larger in dimension than the recessed surface 914 with side or mounting tabs 952, 954 that provide surfaces for mounting to the side wall 910 about the recessed surface 914, e.g., mounting with adhesive 960 adjacent to side walls 918, 919 of recessed surface 914.

The recessed surface 914 is defined in depth and shape by side walls 918, 919 and includes a back or rear wall 916 attached to side walls 918, 919 for receiving image element or substrate 920, which may be attached using adhesive (not shown). An interlaced image 922 is shown on the surface of substrate distal to the wall 910 (or proximate to lenticular array 956 and its series of lenticules 958. The lenticules or lenses 958 are paired with and registered to or mapped to portions or slices of the data in image 922. A focusing gap 930 is provided that may be filled with air or other fluid and Cat defines (along with the thickness of array 950) the focal length, $L_{FOCAL}$, of the lenses 958. The container wall 910 may be formed from plastic, glass, cardboard, metal, or other materials useful for providing containers for products such as consumer goods that typically are displayed on shelves to provide "eye catching" graphics when provided the view of system 900 as shown in FIG. 10.

Figure 11:
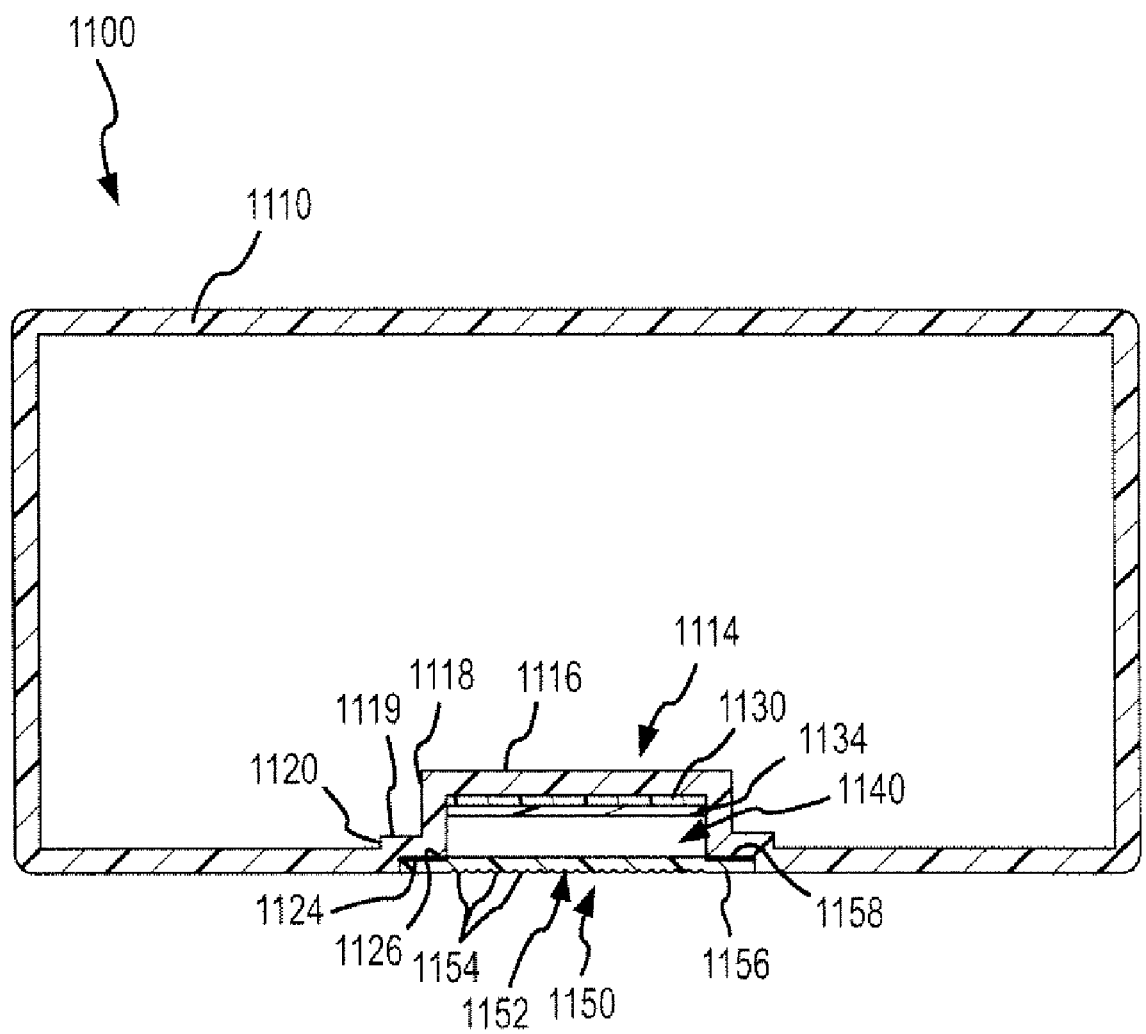
FIG. 11 is a cross section view similar to that of FIG. 9 showing yet another packaging system of the invention in which the recessed surfaces in the container wall include an image registration surface and also a shelf for receiving peripheral mounting, positioning tabs of the lenticular lens element such that the lens element's outer surfaces are substantially level or concurrent with container wall outer surfaces.

FIG. 11 illustrates with system 1100 a variation of the system 900. In this embodiment (which may be implemented in other cross sectional shapes) 1100, the side wall 1110 is configured for receiving not only a image element 1130 with a printed image 1134 but also the lens element 1150. In this manner, the side wall 1110 with the image producing assembly can be relatively flush rather than having a label protruding as shown in system 900. As shown, the a recessed surface 1114 for receiving and supporting the image element 1130 is formed with a back or inner wall 1116 surrounded by side wall(s) 1118. A step 1119 is then provided to a second side wall 1120 to provide a second recessed surface for receiving the lenticular lens element 1150. The second recessed surface is provided by shelf 1124 and side wall(s) 1126. The lens element 1150 includes a lens array 1152 made up of a plurality of lenticules or lenses 1154, and the lens element 1150 may be attached at tabs or attachment surfaces 1156 with adhesive 1158 or by other methods. The arrangement shown in system 1100 produces or provides a spatial gap 1140 that again may be filled with air or other fluid to provide enhanced focusing by providing a desired refractive index or characteristics and by increasing the focal length of the lenses 1154 onto the image 1134.

Figure 12:
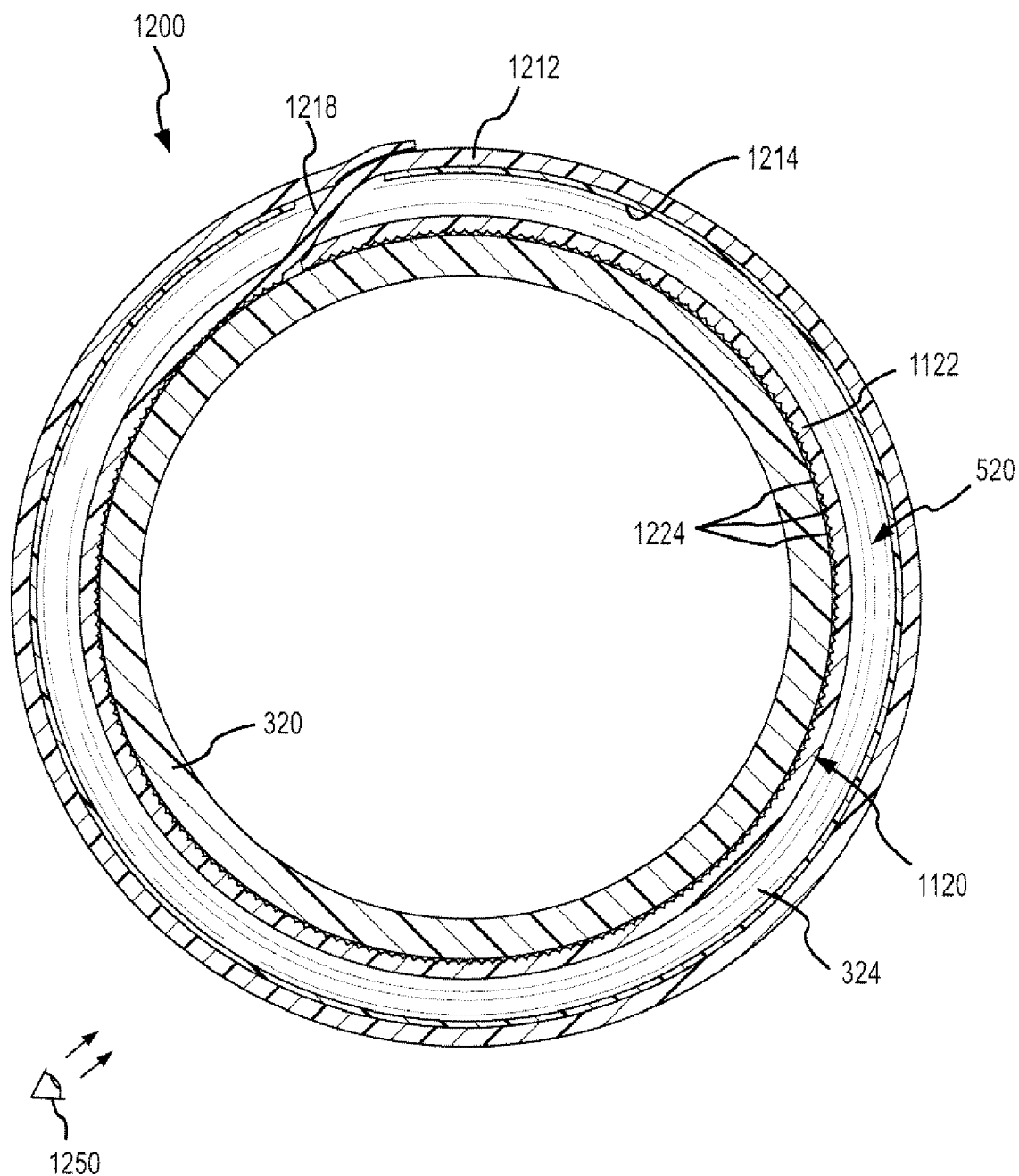
FIG. 12 is a cross section similar to FIG. 5 of another embodiment of a packaging system in which a two-part wrap-around label is used to create a focusing or spatial gap (or "air gap") but with the lenticular lens element being in contact with the container wall in the recessed surface and the image element creating the external sleeve over the lens element.

FIG. 12 illustrates yet another embodiment of a packaging system 1200 useful for obtaining an air gap to allow thinner lens material to be used and lower LPI lenticular arrays. The embodiment 1200 may be applied to a container 300 without additional modification. System 1200 differs from system 400 in that the lens element is positioned within the recessed surface with the lenses abutting the container wall 320 in such recessed surface. The focus line is through the container and its contents, through the lens array, then an air gap, and finally to the printed image provided on a label that may be a wrap around as shown or a label that extends for a portion of the container circumference. As a result, the container wall 320 needs to be transparent or at least translucent as does the contents (e.g., water or other clear fluid) or air when the contents/product is removed (e.g., view an image such as information regarding a prize, a contest result, a coupon, or other data after the a beverage or other product is removed from the container 300).

As shown, the container wall 320 includes a recessed surface defined by registration wall or shoulder 324 (and 322 shown in FIG. 3). The system 1200 includes a one piece label that can be wrapped about the container wall 320 in a single process, but in other embodiments, the lens element and image element are provided separately similar to the embodiment 700 of FIG. 7. During the application process, the lens element 1220 is applied or wrapped about the container wall 320 at the recessed surface such the lenticules 1224 of the lens array 1222 are facing inward toward the container wall 320 and typically so that the lenses 1224 contact the recessed surface. The shelf 324 is useful for aligning or registering the lens element 1220 in the system 1200 and typically, the lens element 1220 will have a width equal to or slightly less than the width of the recessed surface (with some embodiments having a width that is significantly less than the width of the recessed surface). Adhesive (not shown) may be used to attach the lens element 1220 (but preferably not at the lens array 1222 to avoid distortion issues when adhesive is applied between the lenses 1224 and the wall 320). The lens element 1220 may extend entirely about the wall 320 at the recessed surface as shown or extend for only part of the container circumference.

Next, the extension element or neck 1218 stretches across the depth of the recessed surface (or spatial gap 520) so that the wider lens element 1212 can be attached to the container wall 320 at attachment surfaces near or adjacent to the recessed surfaces (or shoulders 324), e.g., as shown for in FIG. 4 at attachment surfaces 412, 414 for lens element 120 of wrap 110. The image element 1212 is typically glued or otherwise affixed to the container wall 320 so as to provide a sleeve or enclosing layer over the recessed surface and to form the focusing or air gap 520. The image element 1212 typically will extend about the entire circumference of the container wall 320 as shown with an overlap provided in some case to facilitate attachment by bonding the element 1212 to itself as well as to wall 320. An interlaced image 1214 is provided on the element 1212 and is mapped or registered to the lenses 1224 of array 1222 so as to create a viewable image through the container as shown at 1250, with the image (not shown) being projected outside the container system 1200, inside the wall 320, and/or at the surface 1212. The image 1214 may be provided on a surface of image element or wrap 1212 as shown or be provided on an exterior or distal surface of the element 1212. As with the other interlaced images, the image 1214 may be printed onto the image element body or attached after being formed on a different substrate.

In some embodiments, it may be desirable to provide a spatial gap in containers or packaging for which no recessed surface is provided or available. For example, many containers such as plastic bottles, glass bottles, jars, and the like, paper/cardboard boxes, and other containers (or products) have walls with smooth outer surfaces, but it is still useful to create a gap by applying a label in a wrapping or rolling process as discussed above. In such cases, a label can be provided that uses raised shoulder or surfaces to achieve a spatial gap to benefit from the refractive index of air or other gas rather than having to rely on label thicknesses alone.

Figure 13:
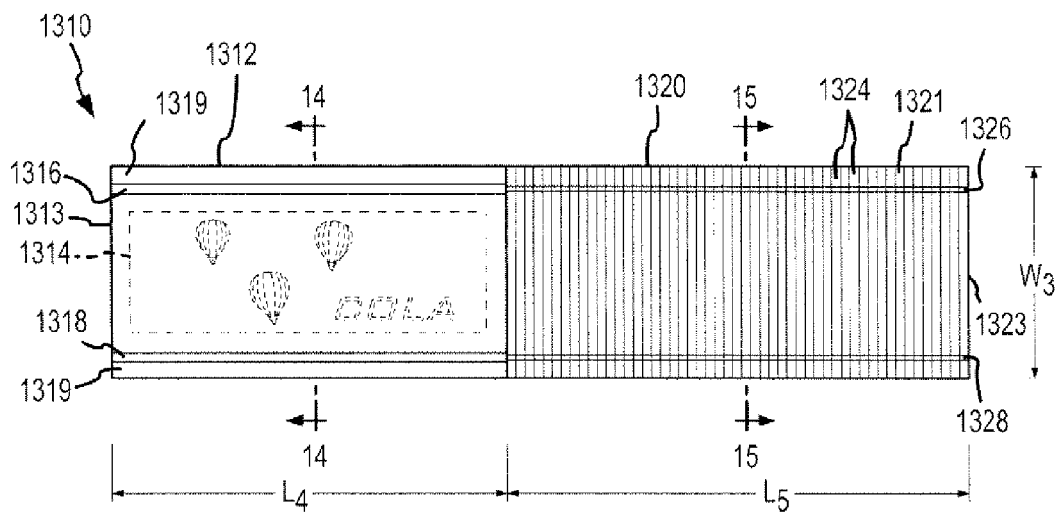
FIG. 13 is a view similar to FIG. 1 of another embodiment of a wrap around label useful for achieving a focusing or spatial gap between a lens array and a printed image on a container with flat walls (e.g., without use of a recessed surface)

One such embodiment of a wrap around label 1310 with "shoulders" is shown in FIG. 13. The label 1310 differs from label 110 of FIG. 1 in that it is formed from a single sheet of material (but, of course, it could be formed by laminating two pieces together as discussed for label 110). The label 1310 also differs from label 110 in that the image is 1314 is printed on the opposite side as the lenses 1324 so as to utilize the thickness of the label 1310 twice, e.g., once for the lens element 1320 and once for the image element 1312, but, again, the image 1314 may be provided on the same side as the lenses 1324 as was shown in FIG. 1 for label 110.

Figures 14, 15:
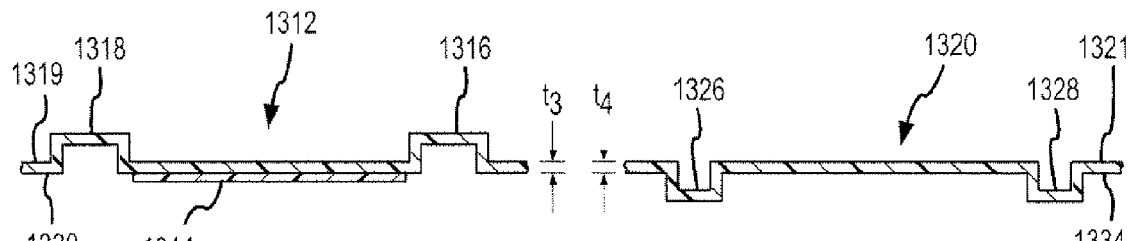
FIG. 14 illustrates a cross section of the image portion or element of the label of FIG. 13 taken at line 14-14.
FIG. 15 illustrates a cross section of the lens portion or element of the label of FIG. 13 taken at line 15-15.
Figure 16:
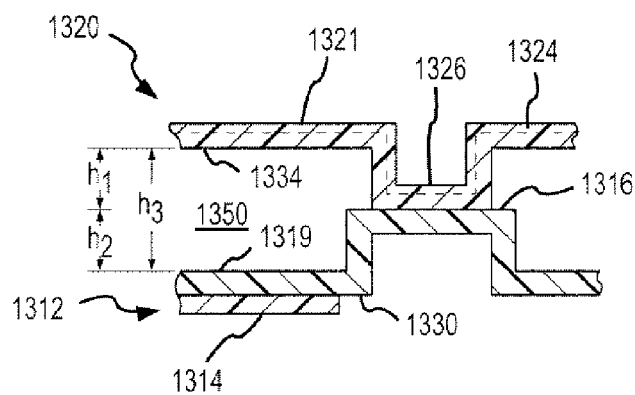
FIG. 16 illustrates a partial cross section of an assembly package system or packaged container similar to FIG. 6 showing the label of FIGS. 13-15 as applied in a double wrap to create a spatial gap that may be filled with air to provide a focal length that supports focusing on the back of the image element (or in other cases on the front of the image element as shown in FIGS. 5 and 6)

As shown in FIGS. 13-15, the label 1310 includes an image element or portion 1312 and a lens element or portion 1320. The two elements 1312) 1320 have a single width, $W_3$, in most embodiments and have lengths, $L_4$ and $L_5$ that are typically equal such that each element is wrapped about a container once. The image element 1312 includes a first side 1319 and a second side 1330. An interlaced image 1314 is provided, e.g., by printing, on the second or "reverse" side 1330 in the illustrated embodiment so as to increase the distance from the image 1314 to the lenses 1324 (e.g., to provide a larger focal length). In other cases, though, the image 1314 may be provided on the surface 1319 with the lenses 1324. The image element has a thickness $t_3$, such as the thickness of an extruded sheet (e.g.) 0.5 to 10 mils or more). The image element 1312 is formed so as to have two raised shoulder 1316, 1318 on the first side and extending along the length of the element 1312 from end or edge 1313 to the lens element 1320. In one example, the shoulders 1316) 1318 are formed by embossing of the label 1310 after the printing or application of image 1314 and are provided in a continuous manner adjacent the image 1314 (but in other cases, the shoulders 1316, 1318 may not be continuous and/or may be provided in only portions of the element 1312). With reference to FIG. 16, the height, $h_2$, of the raised shoulders 1316, 1318 may vary to practice the invention, but in some embodiments is about 25 to 100 percent of the thickness, $t_3$, of the image element 1312. For example, the label 1310 may have a thickness of about 0.5 to 10 mils or more and the height of the raised shoulders 1316, 1318 may be about 0.125 to 10 mils (or more). The cross section of the shoulders 1316, 1318 (and 1326, 1328) is shown as square or rectangular as being easy to form and providing good mating surfaces, but in other embodiments, the cross section may be arcuate, triangular, or other shape, The lens element 1320 extends from image element 1312 to end 1323 and includes a plurality of lenticules or lenses 1324 that provide a lens array for viewing the image 1314. The lens element 1320 has a thickness, $t_4$, that typically is about the thickness of the image element, $t_3$. The lenses 1324 are formed on a first side 1321 of the lens element 1320, which typically is the opposite side of the label 1310 as the image 1314. The lens element 1320 includes a second side or surface 1334 upon which a pair of raised shoulders 1326, 1328 is provided (or recessed surfaces 1326, 1328 are provided on first side 1321). The shoulders 1326, 1328 are shown to extend along the length of the lens element 1320 from the image element 1312 to the end or edge 1323 (but, may be provided as two or more shoulders rather than one unitary shoulder). As with the shoulders 1316, 1318, the shoulders 1326, 1328 are typically Conned (such as by embossing) in the label 1310 after the printing of image 1314 and the forming of lenses 1324. The height, $h_1$, of the raised shoulders 1326, 1328 may be about the thickness, $t_4$, of the lens element 1320 or some smaller value, and typically is about 0.125 to 10 mils or more depending on the thickness, $t_4$, of the lens element 1320.

As with the label 110, the label 1310 can be applied to a container, such as glass or plastic bottle or other container in a rolling or wrapping process or other process useful for applying such labels. A partial sectional view of such a label 1310 as it may appear when applied to a container is shown in FIG. 16. As shown, the image element 1312 would contact a container or other surface (not shown) such that the image 1314 abuts the container. To this end, the image element 1312 is wrapped onto the container first starting at end 1313 (e.g., with adhesive provided near this end 1313 on surface 1330). The raised shoulders 1316, 1318 extend outward from the container outer surface and from the first or front side 1319 of the image element by the height, $h_2$, which may be up to a thickness, $t_2$, of the image element 1312 (or label 1310). Typically, the length, $L_4$, of the image element 1312 is such that the container wall is wrapped completely one time.

With the image element 1312 attached, the lens element 1320 is wrapped onto the container surface as shown in FIG. 16 over or so as to contact the image element 1312. Preferably, the rolling or label application is done such that the shoulders 1316, 1318 of the image element 1312 contact (e.g., receive and support) the raised shoulders 1326, 1328 of the lens element 1320. As shown, this results in the creation of a gap 13510 (e.g., a spatial gap filled with air, gas, or other fluid) that has a gap length, $L_{gap}$, of the combined heights of the two raised shoulders. The shoulders 1316, 1318, 1326, 1378 may have the same width or differ as long as good mating surfaces are achieved to establish and maintain the gap 1350, and the width of these shoulders typically will be from about 0.1 to 0.5 inches (or more or less to suit a particular application). Likewise, the heights, $h_1$ and $h_2$, of the shoulders may be equal or differ to practice the invention. In one embodiment, a gap 1350 with a length, $L_{gap}$, of 20 mils was achieved with lens and image element thickness, $t_3$ and $t_4$, of 10 mils each.

The following is a discussion of one exemplary technique for fabricating the wrap around label 1310. In this exemplary process, the tenses 1324 in the lens element 1320 typically would be created by extruding or embossing. The label 1310 would typically be formed of a clear plastic material, such as, but not limited to, cast propylene, oriented polypropylene (OPP), APET, polyester, polyvinyl chloride (PVC), propylene, polycarbonate, or the like. For example, an extrusion cylinder or drum may be provided with a surface with surfaces that alternate between a mirror image of the lenses 1324 or lens element 1320 (i.e., is useful for defining the lenses with a wave pattern cross section to form the protruding ribs or lens surfaces of lenses 1324 in vertical or horizontal patterns) and a smooth or blank surface corresponding to the initially smooth surface 1319 of the image element 1312. In this manner, a sheet of material is produced with a plurality of labels 1310 with an image element 1312 adjacent to a lens element (but without shoulders 1316, 1318, 1326, 1328). Extruders and corresponding cylinders are typically useful for label or material thicknesses of less than about 35 mils, and, the label 1310 when applied as shown in FIG. 16 is able to achieve a focal point of over 35 mils by extruding the label 1310 with thicknesses well below 35 mils (e.g., 10 mil thicknesses can achieve thickness of up to 40 mils). Alternatively, the lenses 1324 may be embossed onto a flat sheet of clear plastic material. The extruded or embossed material is typically sheeted or rolled in rolls for flexographic or web printing. The printing of the image 1314 on each label 1310 on the sheet is typically performed on the second or reverse side 1330 (e.g., on the non-lens side of the wrap or sheet). The printing of the interlaced image 1314 is not done directly behind the lenses 1324 as in conventional lenticular printing.

The "tack and wrap" labels 1310 are then into strips with a number of labels 1310 or left in roll form. The shoulders 1316, 1318, 1326, 1328 are formed in the labels 1310 by embossing into the sides of the labels 1310. For example, the shoulders 1316, 1318 are formed by embossing the side 1330 while shoulders 1326, 1328 are formed by embossing the lens side 1321. This may be done in combination or separately, and such embossing may be done separately or concurrently with operations to cut each label from the strip or rolled sheet.

The spatial gap 1350 is created to coincide with the desired focal length of the lenses 1324 to the interlace image 1314 when the label 1310 is applied to a container or package. These wraps 1310 are for the most part "mirror-printed" or second surface printed (as could be label 110 and other labels shown herein). Therefore, the focal lengths are calculated by combining the refractive index of the plastic used in the lens element 1320 and image element 1312 (which in most, but necessarily all, cases are equal in thickness) along with the refractive index of air (or other fluid) in the gap 1350 and its length. By this technique, viewing angles can be decreased for a sharp focal point at the image 1314, which produces outstanding lenticular graphics at a more course LPI. For example, a 50 LPI label, similar to that shown in FIGS. 13-16 or in FIG. 5 if adapted for reverse side or second surface printing, with a 10 mil gap filled with air was determined to have a viewing angle of 36 degrees while one with a 20 mil gap filled with air was determined to have a viewing angle of 28 degrees, which represents a more desirable configuration for obtaining a good focus on an image. Prior to the present invention, a lens with 50 LPI and a 28 degree viewing angle may have required over 100 mils thickness because it was only using plastic for focusing rather than also using air, which allows a reduction in thickness of 60 mils or about a 60 percent reduction in this example.

In alternative embodiments, the label 1310 may be modified to only include shoulders 1316, 1318 in the image element 1312 or to only include shoulders 1326, 1328 in the lens element 1320. Further, some forms of labels (not shown) with shoulders are provided by forming the labels as discussed above but replacing the embossing steps used to form the shoulders of label 1310 with steps to attach additional material such as bonding plastic strips, applying tape, applying paper, or other strips of material (such as polyethylene or the like) with a thickness of 1 to 3 mils or more to the image element on the surface 1319 and/or to the surface 1334 of the lens element 1320.

With the physical configuration and design well explained, it may now be useful to describe in further detail exemplary processes and mathematical algorithms or techniques in designing the lenticular arrays or plurality of lenses used in the air gap embodiments shown in the figures. For example, it may be useful to explain generally how the frequency, size, shape, and thickness of the lens elements and their arrays are chosen for use in a particular packaging system or packaged container to achieve a desired graphic result, e.g., how are the parameters of a wrap around label such as label 110 found or selected.

In one process, the desired pitch is selected from pre-defined resolution values for an image or packaged container (e.g., what are the resolution goals or desired resolution for a particular product). Once that resolution number is chosen or known, the desired viewing angle is used to determine the gap needed to produce the desired viewing angle. The gap or gap number in turn sets the focusing parameters for the lenticules or lenses of a lens array. One of these focusing parameters of the lenticules is the radius of each lenticule (assuming substantially circular lenses but other cross sectional shapes may be used in some cases). The lens radius is found for the lenticules, and this radius allows the gap focal lengths to be determined.

Such focal length determinations may be performed manually but, in many cases, ray tracing programs or subroutines are utilized to determine the focal lengths for a particular lens radius (or radius based on a particular focal length (e.g., based on an achievable focusing gap)). Ray tracing programs or algorithms are useful as they allow a number of variables or parameters of the design to be changed, with ray tracing results provided quickly to determine if a desired result (e.g., a desired resolution is achieved or the focal length provides focusing on a particular printed image with a set data space/resolution). Typically, such a ray tracing program takes as parameters the thickness of the lens sheet, the material used for the lens sheet (or its index of refraction), the refractive index of the gas in the focusing gap and its length, $L_{GAP}$, and target resolution (focusing width such as $\frac{1}{400}$-inch as discussed in the earlier examples).

For example, a properly designed ray tracing program may be used to fine tune the radius of a lenticule. The diameter(s) of the container (e.g., bottle, can, cup, or the like) may be used to determine the radius of the cylinder upon which the lenticules sit or are positioned, e.g., the diameter, $D_1$, of wall 310 in FIG. 3 outside but near the recessed surface 320 where the image is positioned. Then, the ray tracing program can be used to accurately determine the focal length of the lenticule and for the lens array. If this particular radius fails to achieve a desired result in resolution or in focusing on a printed image, then a larger or smaller radius may be entered into the ray tracing program to tune the lens array to achieve a more desirable lens element such as element 120 of FIG. 1.

The "drop off" of the lenticule is calculated so that cusp areas of the lenticules are known. Too small of a cusp area to support distance would produce a weak lenticular structure. The overall thickness of the lenticular array or pattern is set to give a sufficient support structure.

A further subroutine or algorithm may be used to account for the fact that the lenticules are typically formed or embossed or formed using a flat mold tool but then are later applied or wrapped about a cylindrical or curved area (e.g., the systems 400 and 700 shown above). Such a subroutine preferably converts the radii of the lenticules wrapped on a bottle or other container to the radii of the lenticules when they are cut or formed on a flat sheet of material so that the lens element (such as element 120) is effective for focusing the lenticules on data spaces or portions in a later registered or paired interlaced image. As will be appreciated, the wrapping causes an effective reduction in the lenticule radius, and, hence, the radius formed in the flat sheet is preferably larger to adjust for this effect.

One exemplary subroutine or algorithm corrects for this effect by calculating the "drop off" in the lenticule and reduces this calculated drop off value by the drop off in the cylinder and calculates a new radius to be used in flat fabrication processes. The original "drop off" is the distance from the flat sheet or planar material that is needed to form a lenticule having a particular or desired radius. But, if no adjustment were made, the effective radius would be reduced by the curvature of the container. Hence, the drop off produced by the container side wall is determined at the point of mounting (e.g., based on the radius of the container wall at the mounting location), and this extra drop off is subtracted from the desired drop off such that fabrication can be accurately achieved in a planar or flat sheet of material (such as a thin sheet of plastic used for typical wrap around labels), e.g., by establishing where embossing lines should be positioned or provided to create the lenticules in a lens element to produce lenticules of a particular radius not when formed but when placed on a particular container. In other words, the adjusted drop for use in fabrication of the lens array is equal to the calculated lenticule or lens drop less the bottle drop, with such determinations of "drop" or "drop off" being readily understood by those skilled in the arts with the important aspect here being that it be recognized that such corrections are preferred to achieve a desirable graphical result with the wrap around systems of the present invention. Such a radius correction process preferably is repeated or performed for each container to account for varying mounting surfaces and their corresponding shapes or radii.

With reference to FIGS. 17-20, the following discussion provides further description of how the invention utilizes the combined refractive indexes of plastic in the lens element and image element (e.g., two layers of a wrap around label) and of air in the gap created between such label portions to provide unique focusing capabilities when compared with lenticular lenses that only utilize plastic. Specifically, the following describes a method of determining a focal length of a particular lens or lenticule, such as one used by itself with no air gap and one in which an air gap and an additional layer of plastic is provided (e.g., the thickness of plastic in an image element or portion of a wrap or label).

Figure 17:
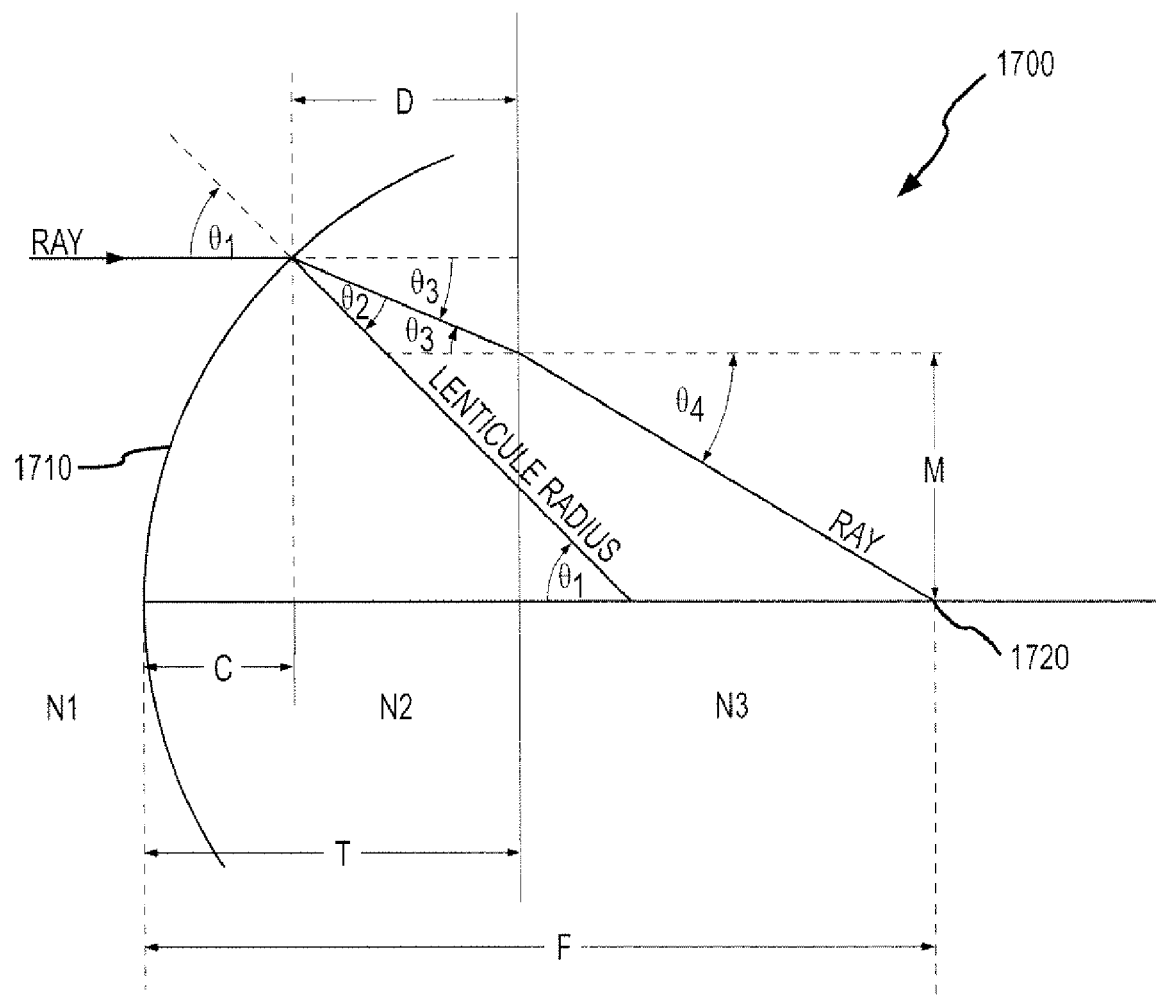
FIG. 17 is a geometric diagram of a single lens that may be provided in a lens array or lens element of the invention but being used without a focusing or spatial gap.
Figure 18:
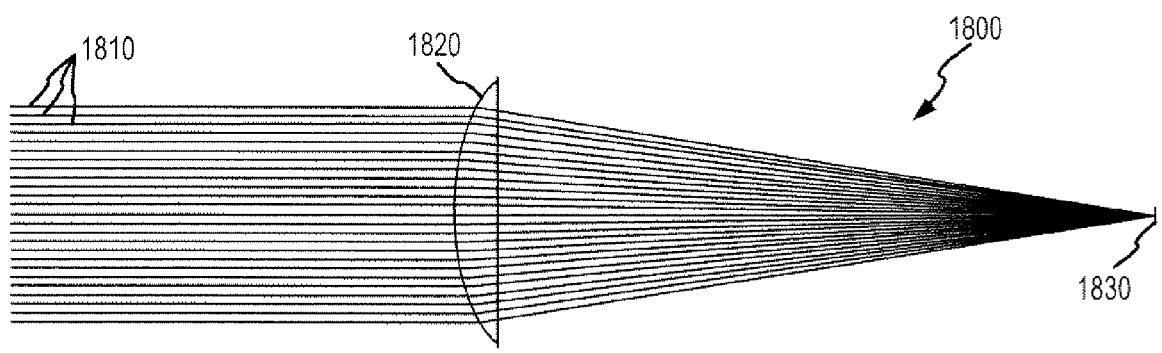
FIG. 18 illustrates a ray tracing for the lens of FIG. 17.

FIG. 17 shows a geometric diagram 1700 of a lens 1710, such as one lens among many in a lens array, that is used to focus an incoming ray onto a focal point 1720. FIG. 18 illustrates a ray tracing 1800 of this or a similar lens or lenticule 1820 that focuses a plurality of rays 1810 onto a focal point 1830. To determine a focal length of a lenticule, the following equations may be utilized:

Snell's law $$N1*\text{Sin}(\text{Theta1}) = N2*\text{Sin}(\text{Theta2}) \quad 1)$$

$$H/R = \text{Sin}(\text{Theta1}) \quad 2)$$

$$\text{Theta1} = \text{ArcSin}(H/R) \quad 3)$$

$$\text{Theta2} = \text{ArcSin}(N1*\text{Sin}((\text{Theta1})/N2)) \quad 4)$$

$$\text{Theta3} = \text{Theta1} - \text{Theta2} \quad 5)$$

Snell's law again $$N2*\text{Sin}(\text{Theta3}) = N3*\text{Sin}(\text{Theta4}) \quad 6)$$

$$\text{Theta4} = \text{ArcSin}((N2*\text{Sin}(\text{Theta3})/N3)) \quad 7)$$

$$C = R - \text{Sqr}(R^2 - H^2) \quad 8)$$

$$D = T - C \quad 9)$$

$$M = H - D*\text{Tan}(\text{Theta3}) \quad 10)$$

$$F = T + M*\text{Cot}(\text{Theta4}) \quad 11)$$

where, with reference to the above equations and FIG. 17:

F=Focal length of lenticule

T=Thickness of lenticule

H=Distance of incoming ray from viewer axis

D=Space between lenticule and flat back surface

R=Radius of lenticule

C=Drop off of lenticule to point of incoming ray

Theta1=Angle of incidence of incoming ray with lenticule surface normal

Theta2=Angle of refraction of incoming ray in lenticule

Theta3=Angle of incidence of ray at back surface

Theta4=Angle of refraction at back surface

N1=Index of refraction of medium of incident ray

N2=Index of refraction of lenticule

N3=Index of refraction of medium of ray in focal area

Using the equations above, the focal length of an air or solid plastic lenticule 1710 can be found. For example, a lenticule 1710 may have the following dimensions and parameters: R=0.027 inches; H=0.0125 inches; T=0.005 inches; N1=10.000; N2=1.49; and N3=1.000. We can use Equation 3 above to find the angle of the incident ray, Theta1, and use the value in Equation 4 to find Theta2, i.e., the refracted angle of the ray entering the lenticule 1710. The incident ray angle on the back surface is Theta3, and it can be found from Equation 5. Equation 7 then gives the angle Theta4 of the ray refracted out of the back of the lenticule 1710 into air. Equation 8 is used to calculate the drop off of the lenticule at the point of intersection. Equation 9 is useful for finding the separation of the lenticule at the intersection point to the back of the lenticule. Equation 10 finds the value M, i.e., the distance from the axis to the exit point along the back of the lenticule. This value is used in equation 11 along with Theta4 found above to calculate the focus F, i.e., the distance from the front of the lenticule 1710 to the point where the ray crosses the axis of the lenticular lens. In this case, it is found to be 0.0796 inches. When N=1, the focal length is instead 0.053 inches. Determining the focal length F and the focal point 1720 is important to the successful use of lens 1720 to focus a viewer's sight on a pattern on a printed substrate, which preferably would be positioned at or proximate to the focal point 1720. If an interlaced image is not sharply imaged, the viewer will see a reduced contrast image and even a confusion of images not intended to be seen at the viewer position.

Other methods of finding the focal point and designing the lenticular structure are useful and can be used to verify the results achieved mathematically above. One useful technique is ray tracing and can be achieved with ray tracing programs carried out by computers or the like. These programs provide a faster and less error prone procedure for the lenticule design and can be used to generate ray tracings or ray tracing plots. A typical ray tracing plot 1800 from a ray tracing program is shown in FIG. 18 showing a tracing of a plurality of rays 1810 as they may be refracted by a lens 1820 onto a focal point 1830, e.g., to provide a tracing for a single lens as discussed with reference to FIG. 17.

Figure 19:
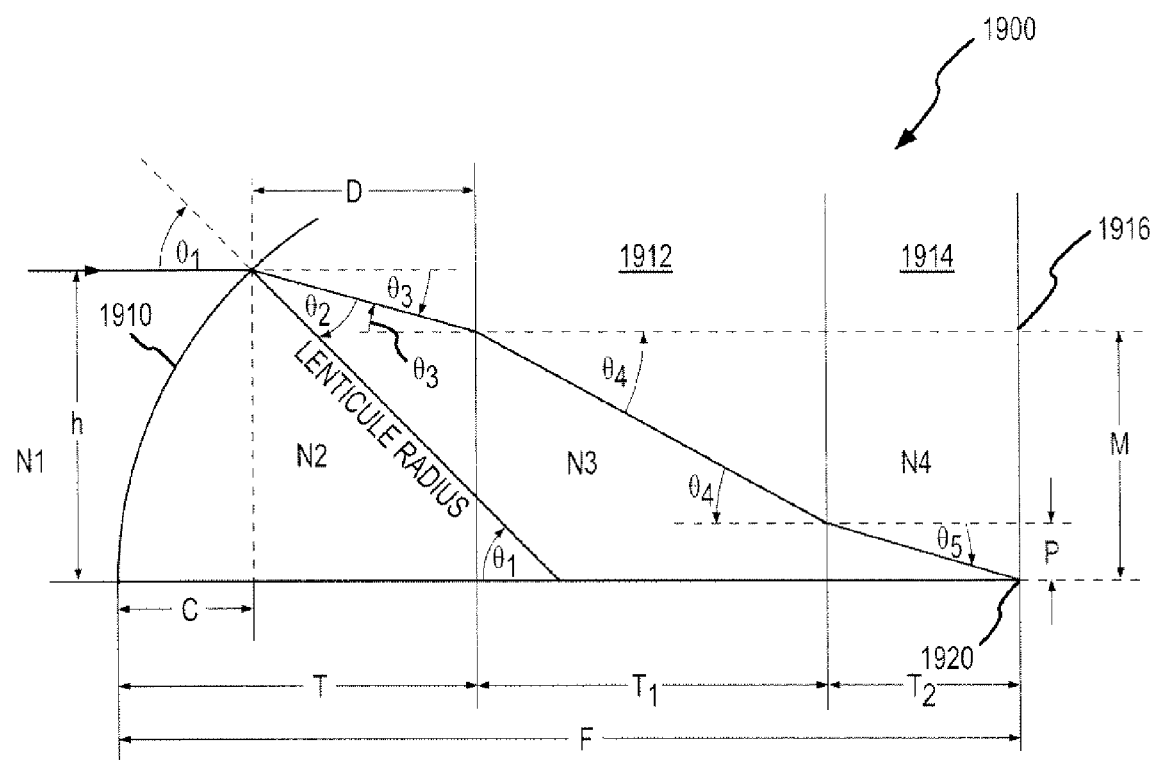
FIG. 19 is a geometric diagram of a single lens in a wrap around label of the invention useful for explaining optical or mathematical calculations that result from the use of a focusing or spatial gap.
Figure 20:
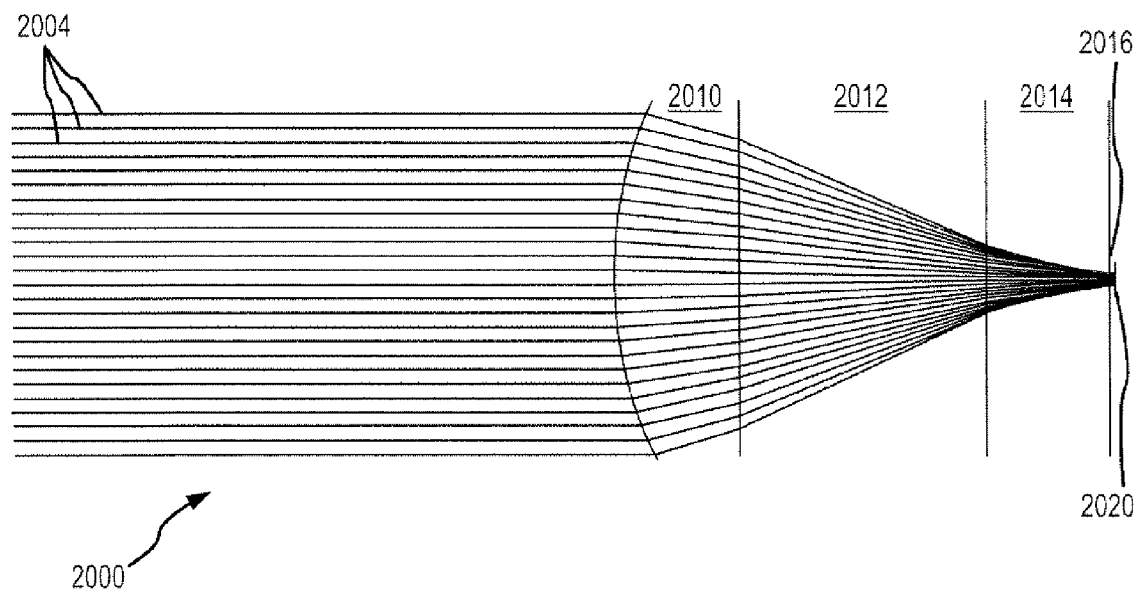
FIG. 20 illustrates a ray tracing for the lens of FIG. 19 showing the rapid bending or refracting of rays provided by air in a spatial gap to achieve desired focusing on a focal point (e.g., on or near a printed image)

As described herein, the packaged containers of the invention are adapted for creating a spatial gap between the lens element and the image element. The graphical or interfaced image may be provided on the image element or portion of the label proximate to the gap or, more typically, be provided on the reverse side distal to the gap to provide additional space for achieving a desired focal length. In this case of a combination of lenticule (or lens element), air gap, and wrap (e.g., plastic sheet or material of the image element), the above calculations and techniques for finding a focal length can be followed with several modifications. FIG. 19 illustrates a geometric diagram 1900 for a lenticule 1910 combined with a gap (e.g., a gap filled with air or other fluid) 1912, and a thickness of clew plastic (i.e., the image element or interior/initial wrap of label) 1914 upon which an interlaced image or printed image 1916 (or slice or single data element of such image) is provided at or near a focal point 1920. FIG. 20 illustrates a ray tracing plot 2000 showing a plurality of rays 2004 being focused through a lens or lenticule 2010, a gap 2012 filled with air, and a layer of label or plastic 2014 onto a printed image 2016 provided at or near a focal point 2020.

The focal length calculation in the cases shown in FIG. 19 may involve the following equations:

Applying Snell's law $$N1*Sin(Theta1)N2*Sin(Theta2) \quad 1)$$

$$H/R = Sin(Theta1) \quad 2)$$

$$Theta1 = ArcSin(H/R) \quad 3)$$

$$Theta2 = ArcSin(N1*Sin((Theta1)/N2)) \quad 4)$$

$$Theta3 - Theta1 - Theta2 \quad 5)$$

Further applying, Snell's law $$N2*Sin(Theta3) = N3*Sin(Theta4) \quad 6)$$

$$Theta4 = ArcSin((N2*Sin(Theta3)/N3)) \quad 7)$$

$$C = R - Sqr(R^2 - H^2) \quad 8)$$

$$D = T - C \quad 9)$$

$$M = H - D*Tan(Theta3) \quad 10)$$

$$(M-P)/T1 = Tan(Theta4) \quad 11)$$

$$P = M - T1*Tan(Theta4) \quad 12)$$

With further application of Snell's law, $$N3*Sin(Theta4) = N4*Sin(Theta5) \quad 13)$$

$$Theta5 = ArcSin(N3*Sin(Theta4)/N4) \quad 14)$$

$$T2 = P/Tan(Theta5) \quad 15)$$

$$F = T + T1 + T2 \quad 16)$$

where with reference to the above equations and FIG. 19;
F=Focal length of lenticule, air, plastic
T=Thickness of lenticule
T1=Air Gap
T2=Thickness of plastic sheet
H=Distance of incoming ray from viewer axis
D=Space between lenticule and flat back surface
R Radius of lenticule
C=Drop off of lenticule to point of incoming ray.
Theta1=Angle of incidence of incoming ray with lenticule surface normal
Theta2=Angle of refraction of incoming ray in lenticule
Theta3=Angle of incidence of ray at back surface
Theta4 Angle of refraction at back surface
Theta5=Angle of refraction into the plastic sheet
N1=Index of refraction of medium of incident ray
N2=Index of refraction of lenticule
N3=Index of refraction of medium between lenticule and plastic
N4=Index of plastic sheet To find the focal length for the lens 1910, we proceed through Equations 1 to 16 to find the focal length. For example, the geometric diagram 1900 may be used to analyze an applied label (such as label 110, 1310) having the following parameters: R=0.0175 inches; H=0.01 inches; T=0.01 inches; T1=0.02 inches; T2=0.01 inches; N1=1.000; N2=1.49; N3=1.000; and N4=1.49.

Often when designing a label according to the invention and the embodiments described herein, the various thicknesses of the layers or components may be set of have desired values (such as a label of 10 mils that provides 10-mil lens element and image element and in some cases, may coincide with a 20-mil gap length but any of the other label/component thicknesses and gap lengths may be inserted in these calculations) and R, the radius of the lenticule, is adjusted (e.g., formed in embossing or extrusion operations) so that the focal length comes out to match the other desired values. Again, it may be useful to use a ray tracing program to save doing the tedious calculations, and the results of such a tracing using the parameters provided above is provided in FIG. 20. The plot 2000 shows that with a lens element of 10 mils, a gap length of 20 mils, and an image element of 10 mils that rays 2004 can accurately be focused onto a focal point 2020 at which a data image 2016 may be provided with a lenticule radius of 0.0175 inches, which represents a significant improvement over what can be achieved with just the use of plastic (e.g., without the gap between the lens and image element or by providing an image on the back of lenticular array).

In the ray tracing program (whose results are shown in FIG. 20), the curvature of the bottom of the lenticule is also taken into account as the structure is wrapped around a bottle. The focal length calculation can thus be thought of as involving four cylinders: the lenticule cylinders, the exit surface of the lenticules, and the cylinders of the wrapped plastic sheet. In the ray trace plot 2000 of FIG. 20, the magnified section does not show these curvatures very well, but it should be understood that they have been taken into account.

The embodiments of the invention typically are designed and implemented using several principles based on the above geometry or focal length determinations, which involve the combination of refractive indexes due to the spatial gap provided by the wrap around labels. The viewer angle is controlled by the pitch to focal length ratio. An exact value can be found by ray tracing; however, an approximation is provided by the following: View angle=Arctan (Pitch/Focal length). The pitch should be small enough to produce a picture of desired resolution. However, the pitch should not be so small that the printed images cannot be accurately placed and separated.

The use of an "lair space" instead of plastic or glass of a thicker lens formation provides a significant improvement as it replaces expensive materials with air or other fluid, Drastic or extreme 3D and animation can thus be achieved at minimal costs and with little or no modification of standard containers and label application (or packaging) processes. For example, in the embodiment 1100 of FIG. 11, the lens element may be 10 mils thick and a focal length of ⅜ inch including the air space or focusing gap is readily attainable, with the printed image being pre-printed on the container or package wall or later placed (such as with a sticker, decal, or the like) The invention allows the use of a coarse lens which corresponds to being able to provide more data (e.g., more frames for animation or 3D effects or simply more impressive and unique graphic images). For example, a 40 LPI lens array with a focal length of 33 mils may be able to provide 48 images or 3 seconds of animation, but with the present invention, a 10 LPI lens array with a thickness of 132 mils (including a lens element or wrap thickness with 1 to 10 mils thickness and the focusing or air gap length) can provide 480 images or up to 30 seconds or more of animation or video.

Building on the prior description, it is useful to note that lenticular cylinders (e.g., cylinders used for embossing a sheet or extruding a sheet with lenticules) are traditionally engraved for the usage of printing the image directly on the reverse side of the lens material. To the inventors' knowledge, there has not previously been a lenticular cylinder produced for the use of creating a lens sheet or lens array on a sheet that can be wrapped about a container so as to create a focal point between the lens and the interlaced image that is greater than the thickness of the lens array (e.g., prior systems relied solely on the lens material itself). Therefore, in these prior applications, the definition of focal length using Snell's Law is clear in that the lens must have a reasonable focus through itself to the back of the lens sheet within a given range of acceptability Snell's Law indicates that the refractive index of the material used in the lens is the basis and the speed limit of the photons going through the material, whether it is glass, plastic, or another material. Other primary information used to determine focal length is the thickness of the material, which is often plastic, the frequency of the lens (e.g., lenses per inch or LPI), and the radius of each lenticule or lens. The radius that is chosen along with the LPI defines a viewing angle, which can vary from a few degrees to almost 90 degrees. Traditionally, the ranges for viewing angle was between 15 and 60 degrees with viewing angles over 70 degrees not presenting a clear or sharp focus (which makes images appear confusing or fuzzy to a viewer).

Lenticular cylinders are generally engraved around the periphery to define a particular lens array and then, indexed so that the cylinder is "spun" on a lathe. However, they can also be engraved across the cylinder. It is useful to note that cylinders are designed to correspond with the thickness of the plastic or glass and are output in that manner. A unique feature of the invention is to design cylinders in more coarse LPI and then use the cylinders to extrude or emboss label material in a thickness that seems to violate Snell's Law regarding focal lengths by not providing the thickness in the label material to create a focal point on the backside of the lens material (or label) itself (e.g., where prior lenticular lens devices provided the interlaced image). An aspect of the invention is to extrude materials at an LPI coarser or with fewer lenses per inch than are mathematically possible or useful if printing directly on the back side of the lens element or lens array. Hence, the identifying of the desirability and the ways of providing of a gap of air and, in some cases, a second layer of label material (e.g., when mirror or secondary side printing) is unique to the invention described herein and is useful for giving a corresponding focus in finished products (or "packaged containers"). In one example, a lens can be extruded at 30 LPI, which would require a thickness of lens material of approximately 140 mils in conventional applications but represents a thickness that cannot be extruded and is not useful for a wrap around label. In contrast, using the labels and packaging techniques described above, a 30 LPI lens can be extruded or embossed at 4 mils and be applied with an air gap of 102 mils to achieve desired focal points. Unless one pre-designs a lens array for the packaged containers with an air gap described herein, there is no need for an extrusion design in which the relationship of the lenses does not follow Snell's Law for focusing on the back side of the lens sheet or material.

As will be clear from the above description, such as with reference to FIGS. 3-5 and the like, it is desirable and advisable to have a mechanism to guide the application of the lens over the interlaced image in order to take an embossed or extruded lens and line it up properly with an air gap and positioned interlaced image on a cylinder container, a box, or other type container. The "registration" mechanism may be part of the container or be provided by the "T" wrap described above with reference at least to FIG. 1. In some cases, using registration shelves is useful as it allows the lens array or lenses to be registered to the images (i.e., aligned properly) without requiring inspection of every packaged assembly or unit. This can be done by creating a shelf (such as the shoulders or shelves defining the recessed surface or other shelf) within the piece that mechanically aligns to the printing in the X and Y axes, and the lens comfortably rests and is secured in place by glue, pressure, tape, or any other fastening technique. P The some embodiments, it may be useful to not have the lenticular lens array cover the entire lens element as is the case in the label 110. For example, in an effort to wrap a container with a lens array corresponding to an interlaced image underneath, it may be difficult to read or scan a Universal Product Code (UPC) and/or other product data provided on a label. In these cases, an area free of (or without) lenticules may be provided in the lens element, such as a spot or strip, such that UPC and other product data that may be included on the container side wall, on a separate label, or as part of the image element can be read or scanned. This blank spot in the lenticular array or lens element can be created during extrusion or embossing processes used to form the lenticules in the lens element.

In some embodiments of the invention (not shown), it may be useful to configure a packaged container so as to hide a set of information on the label such that it is visible only have the contents of the container are removed or consumed. For example, it may be useful to use packaged containers to run a contest. This may desirable for beverage and other consumer product companies. With this in mind, some embodiments of packaged containers may include a "reveal mechanism" to hide a set of data when the container is full and reveal or display the data when the container is empty or at least some of the contents have been removed from the interior space of the container. In some such embodiments, an image is interlaced so that the lines are in a similar color to the beverage or other container contents. In this way, when the viewer looks at the beverage through the interlaced image, a hidden set of data or game message cannot be readily seen until the beverage or container contents are consumed, at which time the hidden data or game message is revealed. In other embodiments, a hidden image is interlaced on the back of the container (e.g., printed or provided on the outer surface of the side wall prior to applying the label or provided on the inner surface of the label (e.g., on the image element distal to the interlaced image that is visible with the container full)). An area embossed in the lens or lens array may have a focal point differing from other portions of the lens array (e.g., the lens may have two sets of lenticules with differing configurations and/or focal points), and this spot or area of lenticules is configured to focus on the hidden image by taking into account the refractive indexes of the double wrap label and also the material of the container side wall (e.g., twice) and the air in the container.

The above description generally describes the use of relatively coarse lenticular lens arrays that focus not on their back surface as was the case with prior arrays but some distance behind this back surface of the lens array. A focusing or spatial gap is intentionally provided to allow the coarser or lower frequency lenticules to provide an excellent image quality or data content without requiring the entire thickness to be provided in the web or lens array. The above description generally describes this focusing or spatial gap as being filled with air, but the description also made it clear that the gap may be filled with other substances such as liquids. The following paragraphs with reference to the figures builds on the spatial gap concept by describing a number of embodiments in which the spatial gap between the lens array and the interlaced image is filled with or provided by other focusing materials or layers such as a thickness of glass, plastic, or other transparent/translucent material as may be found in conventional window (e.g., a stored window, a cooler or refrigeration unit door, a wall of a toy or other consumer product, or the like). In this manner, the inventive spatial gap concepts described herein are utilized to allow lenticular-based displays to be provided on existing windows and similar structures without requiring the window or structure to be replaced or fabricated with lenticular lenses and paired interlaced images.

A challenge facing designers of large displays of interlaced images with lenticular lens arrays has been cost. For example, many in the marketing industry believe it would be highly desirable to provide 3D, color, animation, and other effects that are possible with lenticular lenses in conventional retail stores such as in window displays or in a clear door of a cooler (e.g., where beverages such as soda or beer is stored). These lenticular displays could be used for eye-catching signage and promotional materials that provide unique graphics and, in some cases, product demonstrations via motion or video clips. Conventional lenticular lens arrays or lens elements that focus directly on their back surface (e.g., through their web thickness) to an interlaced image printed on the back surface can be designed to provide such a display but an inherent limitation is the high associated costs. For example, a conventional lens array used to display 30 to 40 images at 20 to 40 LPI can be made from a sheet of glass or plastic but due to the thickness required to provide proper focusing (e.g., 0.125 to 0.5 inches) and associated manufacturing challenges with such material thicknesses, such a lenticular lens array is very expensive to product (e.g., hundreds of dollars per lens array). The thickness of this lens array can be reduced by selecting a much finer or increased LPI lens array, but the interlaced image then becomes harder to produce digitally as discussed above and may hold less data or fewer images. Further costs are associated with installing these large, thick lens arrays including replacing existing windows, doors, and the like, and such store or display modifications are also inconvenient to store managers and owners. Hence, there is a need for a way to provide lenticular-based displays using existing windows and clear doors or walls such as those found in coolers of grocery and liquor stores without using expensive conventional lenticular lenses.

This need can be addressed with embodiments of the invention that provide a spatial or focusing gap between a lens array or lens sheet and a corresponding, interlaced image. The spatial or focusing gap is filled with or provided by the existing windows, doors, or clear/translucent walls of existing fixtures of a retail establishment or a product or other structure. The lens array is configured to focus on the interlaced image based on the refractive index of the lens array or sheet, the thickness and refractive index of the material in the spatial gap, and any other material layers between the lens array and the image (such as adhesives and substrates upon which the image is printed or provided). This solution to the problem is useful because a surface lens can be made at a more coarse frequency or LPI. As a result, the lens array can be provided as a very thin (e.g., several mils in thickness rather than hundreds of mils) sheet of plastic or similar material that is attached to a first side of the existing window, door, or wall while the interlaced image is attached to the opposite side.

For example, the lens array may be provided in a thin sheet of static cling plastic (such as vinyl or other plastic), pressure sensitive material, or traditional APET, PVC, PETG, or the like. This thin film is engineered or designed to have an appropriate focal length through the glass, plastic, or ceramic in the spatial gap to focus back to the interlaced images on the opposite side of the spatial gap. The refractive indices are combined to create the appropriate focal lengths provide such accurate focusing through the various material layers. An advantage of combining the thin sheet of plastic or other material having the lens array with the window, door, or other structure providing the spatial or focusing gap is that the combined masses of the lens array and material in the spatial gap allow a fine focus with a much more coarse LPI than a lens that has to focus on its back surface. For instance, a conventional cooler used in a grocery or convenience store has a pane of glass with a thickness of about ⅛-inch (or 125 mils). A lens array can be applied to an outer surface (e.g., surface facing consumers) of the cooler door that has a frequency of up to 20 to 40 LPI or more to focus on an interlaced image provided on an inner surface of the cooler door (e.g., an interlaced image containing 40 images or the like), A conventional lenticular lens structure that is 28 inches by 40 inches used to replace the door pane would likely cost at least S100 to manufacture after engineering has been completed. In contrast, a lenticular lens display assembly of the present invention that includes a lens array in a thin plastic sheet attached to an existing door pane combined with an interlaced image positioned on the opposite side of the door or door pane would likely cost less than about $1. The lens array may be left on the window or door and the image may be replaced periodically to update or change the display, and this embodiment of the invention provides a very inexpensive yet very effective technique for creating large lenticular displays with simple modifications of existing structures. The following provides a description of lenticular display assemblies using "filled" spatial gap embodiments of the invention as well as describing the methods of engineering or designing kits for fabricating or installing such assemblies. Hence, the invention may be thought of as including lenticular display assemblies, kits for creating such assemblies, and also the methods of forming and installing such assemblies or kits.

Figure 21:
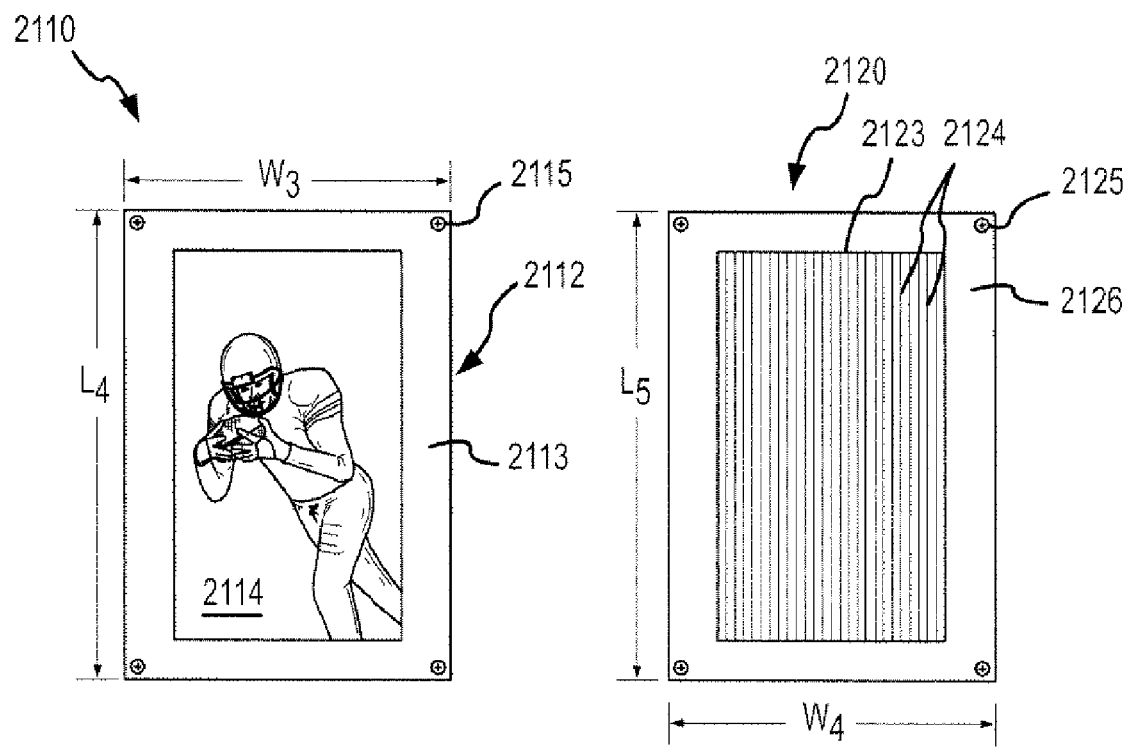
FIGS. 21 and 22 illustrate plan and side views of a lenticular display kit of embodiments of the invention in which a lenticular lens sheet and a corresponding image element are provided for mounting on a clear to translucent window, door, wall, or the like to create a lenticular display assembly.
Figure 22:
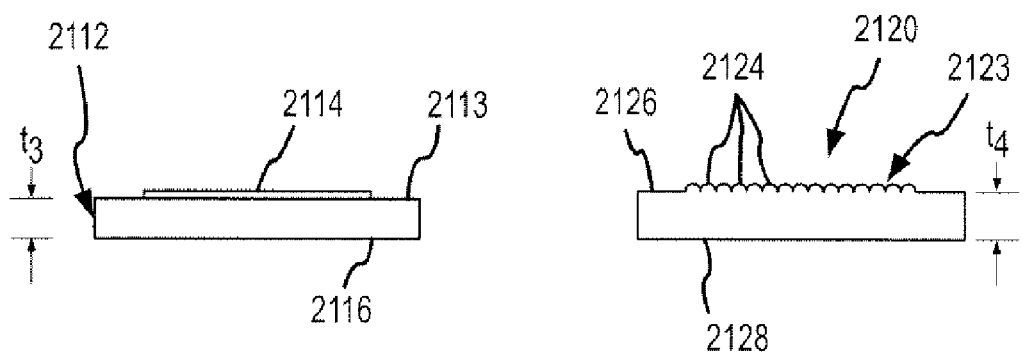

In FIG. 1, a wraparound label 110 is provided that includes both an image portion 112 and a lenticular lens element 120 in a single body. In contrast, FIGS. 21 and 22 illustrate another embodiment of the invention in which a display assembly or kit 2110 that includes two separate components to provide the lenticular lenses and the corresponding or paired interlaced image. Specifically, in one embodiment, an image element or label 2112 is provided that includes a substrate with a first side 2113 upon which an interlaced image 2114 is provided such as with digital printing or the like and a second side 2116 that is typically attached to a spatial gap filler or substrate (i.e., a pane of glass or plastic in an existing window or door or the like) with adhesive or the like. The kit or assembly 2110 further includes a lenticular lens element, sheet, or label 2120 formed from a sheet or other layer of transparent or at least translucent material such as plastic. The lens element 2120 includes a first side upon which is formed a lens array 2123 made up of numerous lenticules 2124 and a second side 2128 that is typically planar and attached to abut a surface of the spatial gap filler or substrate (e.g., a side of the pane of glass or plastic opposite the side upon which the image element is mounted) such as using a static cling sheet as the sheet 2120 or using an adhesive layer or even tape or other mounting methods.

Visible on the first surface 2126 of the lens element 2120 are two or more registration elements 21.25 that are used to align the lens array 2123 with the interlaced image 2114 (e.g., to align lenses 2124 with sets of image slices in the image 2114) by matching the elements 2125 with similar elements 2115 provided on the image element 2112 such as on the first surface 2113, on the second surface 2116, or within the image 2114. The registration element elements 2115, 2125 may take the form of cross hairs or similar designs common in rifle scopes and cameras or may take other forms useful for aligning the lenticules 2124 with the interlaced image 2114 such as lines running parallel to the lenticules and/or to the elongate image segments of image 2114. The registration marks 2125 can be placed on the thin lens sheet, sticker, or label 2120, and the marks 2125 are used when the kit 2110 is installed to line up the registration of the images 2114 placed opposite the lenses 2124 on a window, clear door, or the like.

The image element 2112 has a width, $W_3$, and a length, $L_4$, that may be relatively small such as 8.5 by 11 inches similar to regular sheets of paper or smaller but more typically is relatively large such as the size of common promotional posters that are placed upon retail store windows and on cooler doors. For example, a window display kit 2110 may be 4 foot by 6 foot or larger (or smaller) while a cooler door display kit 2110 may be 2 by 3 foot or other useful dimensions. Similarly, the lens element 2120 has a width, $W_4$, and a length, $L_5$, that is selected for the window, door, or other location upon which it is to be mounted and typically the dimensions of the image element 2112 and the lens element 2120 are the same or similar. The image 2114 is typically mirror printed upon a surface 2113 of a substrate (such as a clear plastic sheet or substrate) with a thickness, $t_3$, that is generally quite thin such as less than about 3 mils). The lens element 2120 is typically a thin sheet of plastic or other clear to translucent material in which the lenses 2124 of the lens array 2123 can readily be formed, and the lens element 2120 typically has a small thickness, $t_4$, relative to conventional lenses that have to focus on the back surface 2128, e.g., the thickness, $t_4$, is typically only several mils thick such as less than 10 mils and more typically less than 5 mils and even more typically less than about 2 mils.

The interlaced image 2114 may be printed digitally onto the surface 2113 in part because the lens array 2123 is in many embodiments relatively coarse such as less than about 60 LPI but more typically up to about 40 LPI (such as 20 to 40 LPI). The images 2114 may also be provided in any of the other ways discussed herein such as with screen printing, printed offset, and the like. The material used for the image element 2112 or its substrate may vary to practice the invention depending upon whether the image 2114 will be positioned to abut the material in the spatial gap or the substrate will be next to this gap (e.g., does the substrate of the element 2113 need to be transparent or at least translucent or can it be opaque such as when the image is proximate to the gap). In this regard, the images 2114 may be printed on paper, plastic, or other substrates. The image 2114 are pre-engineered as discussed above with reference to FIGS. 17-20 to match the pitch frequency of the lens array 2123 with expected position of the viewer taken into account to provide a viewing distance for the display 2110 when it is installed (e.g., see the formula and calculations provided in the prior discussion).

Figure 23:
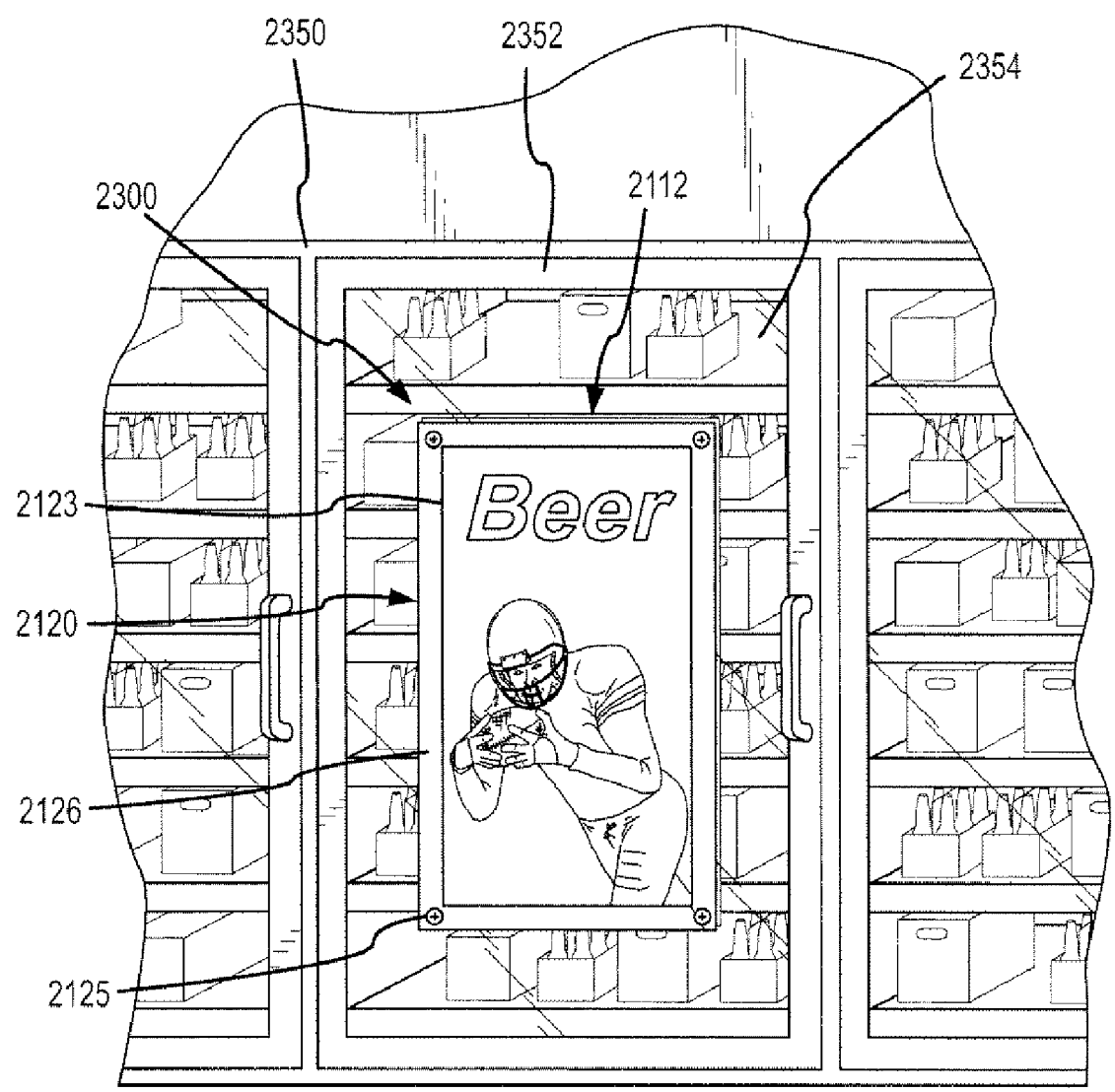
FIG. 23 illustrates a lenticular display assembly of embodiments of the invention that is shown installed in a cooler such as those found in convenience and grocery stores.

FIG. 23 illustrates a lenticular display assembly 2300 installed in a cooler or refrigerator 2350 with a door 2352 having a clear pane 2354. For example, the cooler 2350 may have a glass pane 2354 in the door 2352 as is common for coolers or refrigeration units used in convenience stores, liquor stores, grocery stores, and other stores to display beverages, ice cream, and other refrigerated or frozen goods. Of course, the assembly 2300 can also be provided in the pane 2354 of a window or on a wall or structure that includes a clear portion. The pane 2354 is typically formed of glass but other clear to translucent materials such as plastics, ceramics, or the like may be utilized to practice the invention. The pane or spatial gap filler 2354 is typically rather thick in comparison to the thickness of the lens element or sheet 2120 and may be up to 0.25 inches thick or more with a common pane being about 0.125 inches thick (or about 125 mils). Further, the invention may be practiced with single pane windows or double, triple, or more paned windows in which two glass panes are separated by an air or gas gap, and in these cases, the refractive index of each transitional layer between the lens element 2120 and the interlaced image would need to be considered in creating a lens array 2123 that focuses properly on a set of images in the printed image or image element 2112 (e.g., see the discussion provided with reference to FIGS. 24 and 26).

As shown in FIG. 23, the image element 2112 is mounted onto an interior surface of the pane 2354 of the door 2352. On the opposite surface of the pane 2354, the lens element 2120 is mounted such that the registration marks 2125 are aligned with those on the image element 2112 that are visible through the pane 2354. The lens element 2120 is attached, such as by using static forces, tape, an adhesive layer, or the like with the lens array 2123 and surface 2126 facing outward or distal to the pane 2354. The image element 2112 and the lens element 2120 may be as large as the pane 2354 or, more typically, have dimensions less than those of the pane 2354 such that contents of the cooler 2350 are still at least partially visible to a consumer viewing the installed display 2300.

Figure 24:
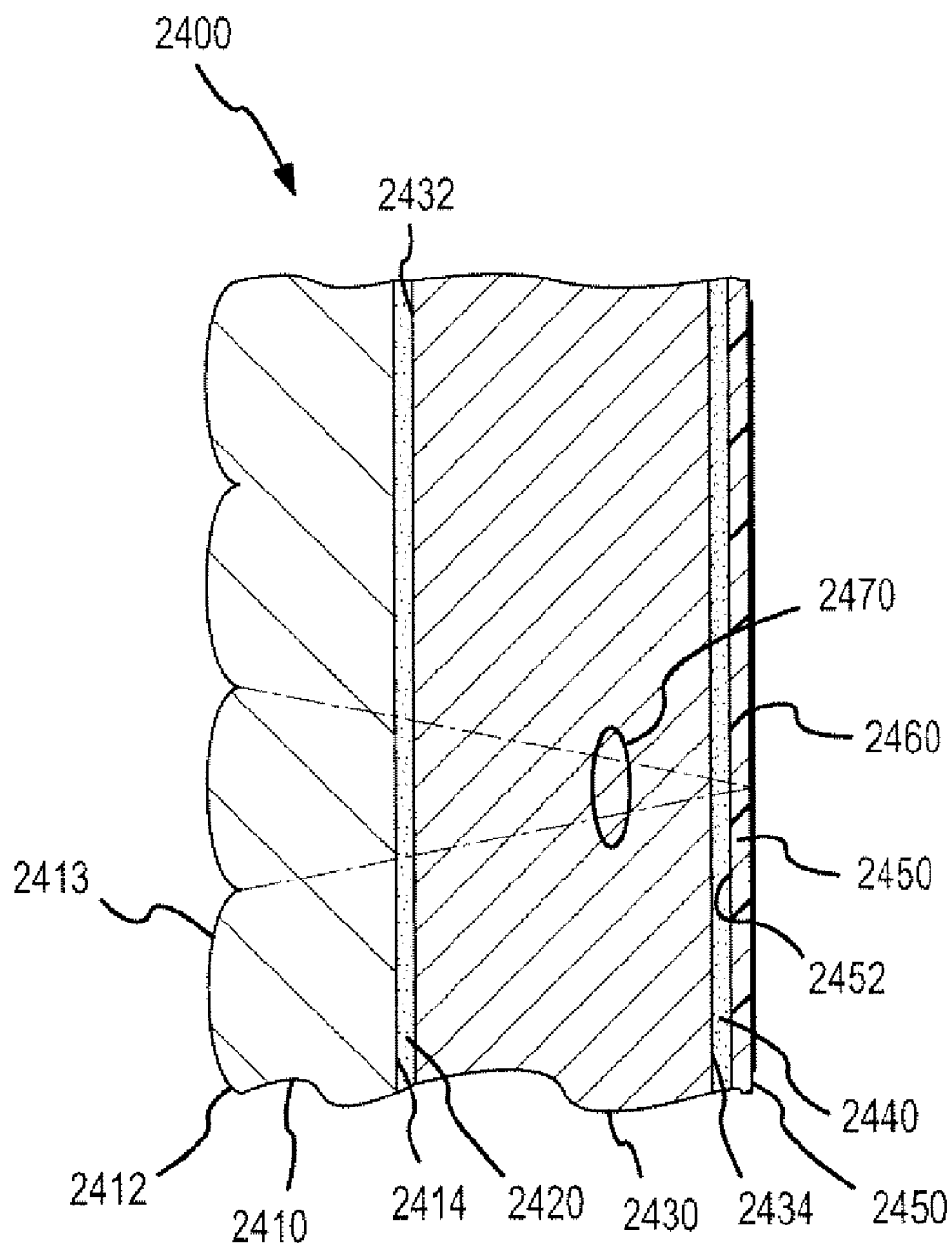
FIG. 24 is a cross section of a lenticular display assembly according to one embodiment of the invention such as a cross sectional view for a portion of the cooler door of FIG. 23.

FIG. 24 illustrates a cross section of one embodiment of a lenticular display assembly 2400 (such as may be obtained by taking a cross at line 24-24 in FIG. 23). As shown, the assembly 2400 includes a lens array or sheet 2410 that is made up of a first or outer surface 2412 upon which a plurality of lenticules or lenses 2413 are formed and a second or inner surface 2414 that is typically substantially planar and is proximate to the spatial gap and image. The focusing or spatial gap between the inner surface 2414 of the lens sheet 2410 and the interlaced image 2460 is defined in large part by a layer of glass, plastic, or ceramic provided by a window or other transparent structure 2430 (e.g., door of a cooler or refrigerated display case). The layer 2430 has a first or outward facing surface 2432 upon which the lens sheet 2410 is mounted using, in this embodiment but not as a limitation, a layer of adhesive 2420, such as a transparent adhesive. The layer 2430 also has a second or inward facing surface 2434 upon which the interlace image 2460 is mounted or more specifically as shown, a substrate 2450 is mounted by the application of an adhesive layer 2440 to a first surface 2452 of the substrate 2450 with the image being printed onto the second substrate surface 2454.

To generate a quality image or display a distance from the lens sheet (e.g., a distance to a viewer from the front of a window or cooler or the like), the lenses 2413 are configured with a radius suited to the thickness and material of the sheet 2410, based on the thicknesses and materials used for the adhesive layers 2420, 2440, based on the length of the spatial gap and the material of the layer 2430 used to fill the gap, and the thickness and material used for the image substrate 2450. More specifically, the refractive index of each material and transition between each set of materials is considered to design a lens sheet or array 2410 that focuses properly on the image 2460 and not directly on the surface 2414 as would be the case in conventional lenticular arrays. Such a focusing of one lens 2413 is shown at 2470 through the spatial gap defined by the layer 2430 (aid other material layers). It is important to note that in the case shown where the image element is provided such that the printing is "mirror" or reverse printed, the thickness and refractive index of the material in the substrate 2450 is also taken into account in the design of the lens array 2410 as well as the calculation of the associated pitch of the lenses 2413. The overall thickness of the lens structure 2400 may change to practice the invention, and in some cases, it is possible that multiple indices of refraction will need to be calculated or used in the design of the lens array 2410 such as three refractive indices for the lens array 2410, the window pane 2430, and the substrate 2450 with additional indices being considered when optional adhesive layers 2420, 2440 are included.

In one embodiment, the lens array 2410 is formed from APET having a 15 mil thickness and a refractive index of 1.64 while the pane 2430 is formed of glass having a thickness of 125 mils and a refractive index of 1.7. The material of the substrate 2450 in this example may be a 6 mil thick sheet of static cling vinyl that is mirror printed. The math would be similar to that discussed with reference to FIGS. 17-20 with the air gap being replaced by the layer of glass. If adhesive is added or used, the math or formulas for designing the lens array 2410 are modified to include the additional refractive indices and transitions to enable the lens array 2410 to focus through the material 2450 to the interlaced images 2460.

Figure 25:
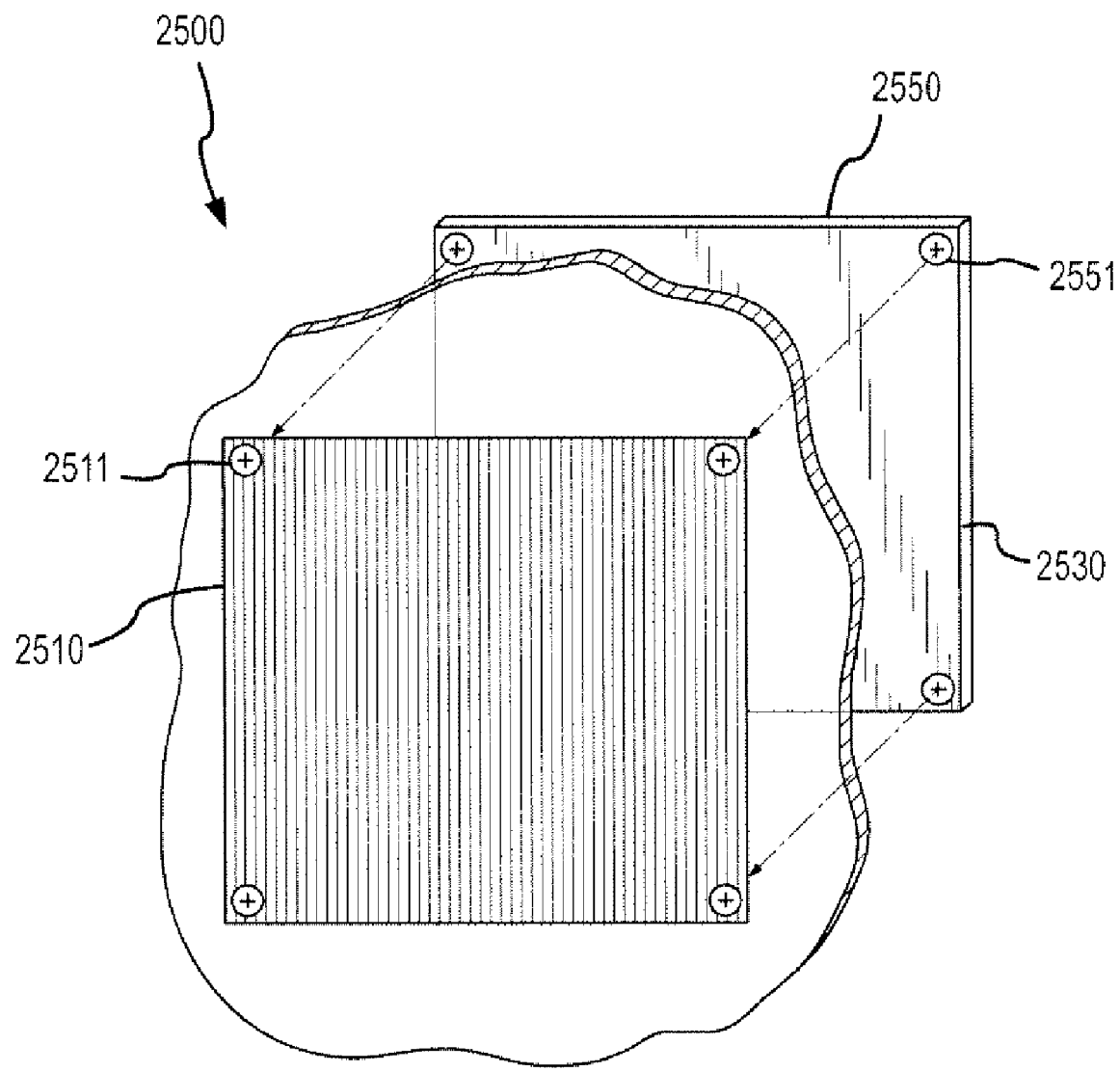
FIG. 25 illustrates the final assembly step for a lenticular display assembly including alignment and attachment of the image element (e.g., substrate with a printed interlaced image) onto clear wall, window, or door opposite the previously attached lens array.

FIG. 25 illustrates a lenticular display assembly similar to those found in FIGS. 21-24 during assembly. More particularly, FIG. 25 shows a display assembly 2500 made up of a lens element 2510 having a lens array and a set of registration marks or elements 2511 in the corners. The lens element 2510 has been applied to the spatial gap defining window, door, or wall 2530 formed of a clear glass, plastic, or the like. Again, the attachment may be achieved simply by using the forces of static such as when the lens element 2510 is formed as a static cling plastic sheet. In other cases, the lens element 2510 is attached with a layer or a partial layer (e.g., a solid or segmented strip about the edges or other locations) of adhesive or simply by using tape or other techniques for attaching a plastic sheet to a window or door. With the lens element 2510 attached, the image element 2550 can be attached to the opposite side or surface of the window, door, or wall 2530. The image element 2550, as discussed above, includes an interlaced image that has been created to correspond to the frequency, size, shape, and other design parameters of the lenses in the lens element 2510. For an effective display to be generated or created by the paired lenses and images, the lenses of the lens sheet or element 2510 have to be accurately aligned or mapped to each other.

In embodiments shown in FIGS. 1-20 this was achieved in some cases with registration shoulders or shelves that helped in the positioning of the image element and the overlying lens element. In the assembly 2500 of FIG. 25, alignment is achieved providing registration marks, such as by printing, embossing, or other by other marking techniques, registration elements 2511, 2551 on both the lens element 2511 and on the image element 2550. The marks 2511, 2551 may be applied after formation of the images and the lenses or, more typically, as part of the formation of these features on elements 2511, 2550. For example, the registration marks 2551 may be provided as part of the data file that forms the images on the image element 2550. The registration marks 2511, 2551 are shown to be cross hair or focusing configurations similar to those found in cameras, rifle scopes, range finders, and the like but in some cases, a single line that is parallel to the lenses of the lens array and parallel to the image segments of the interlaced image may be utilized. As shown, alignment is achieved simply by positioning either the lens element 2510 or the image element 2550 on the glass window or door 2530 and then applying the second element 2510 or 2550 (with 2550 being shown in FIG. 25) to the other or opposite side of the window, door, or wall 2530 such that the marks 2511, 2551 over lap or match up as can be seen through the window, door, or wall 2530. The particular design of the marks 2511, 2551 may vary significantly to practice the invention and may be selected such that all or a portion of both marks 2511, 2551 remain visible to the installer to assist in proper alignment of the elements 2510, 2550.

Figure 26:
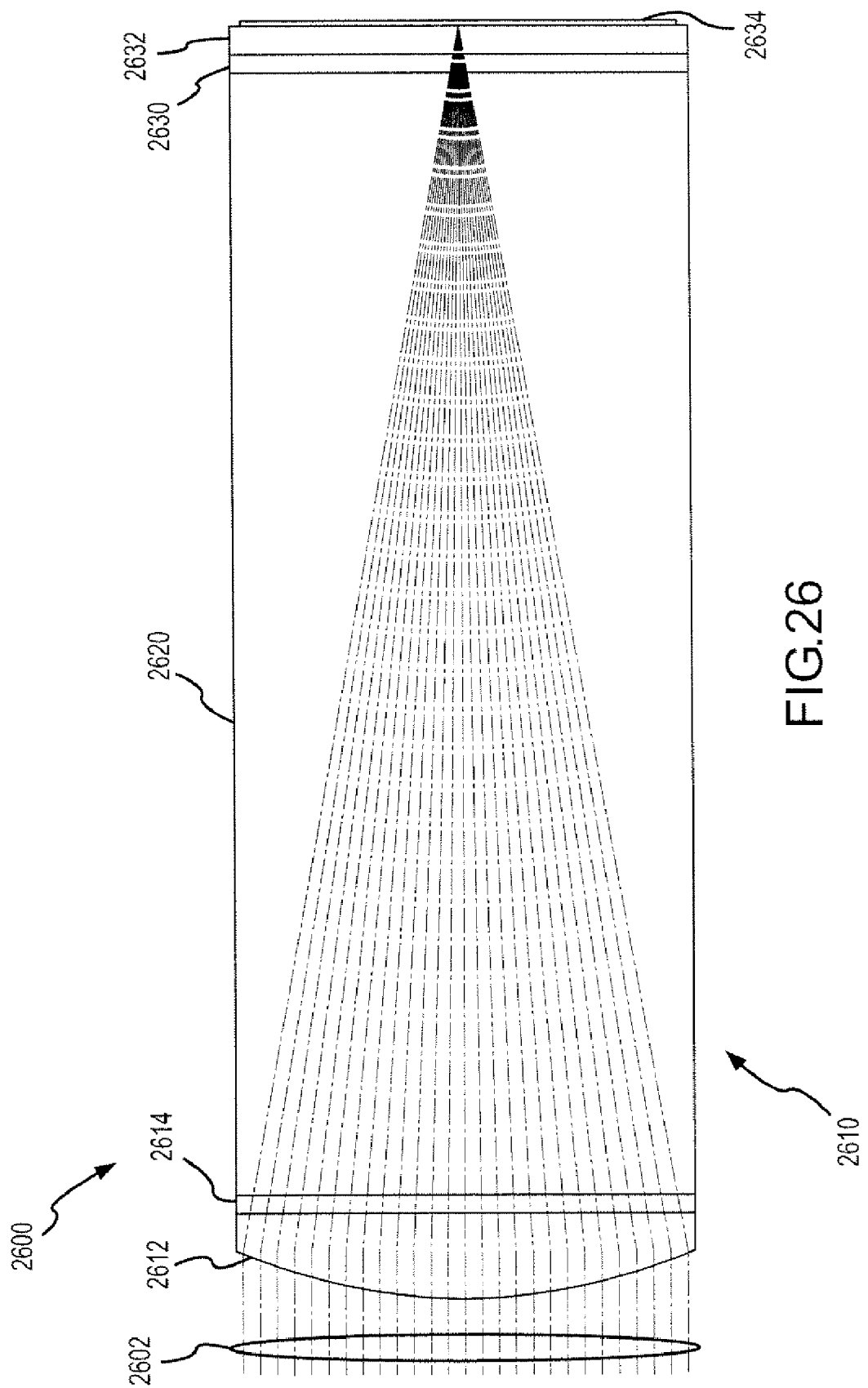
FIG. 26 is a ray tracing similar to FIG. 20 for a lenticule or single lens in a lens array in which the focusing gap is filled with a solid such as glass, plastic, ceramic, or the like and also accounting for refractive indices of adhesive layers and a substrate upon which an image is printed or otherwise provided.

As discussed with reference to FIGS. 17-20, ray tracing algorithms or computer programs may be used to assist in proper design of the lenticules and the lens array of a lens element. FIG. 26 illustrates a ray tracing produced by a ray tracing program for an embodiment of a lenticular display assembly embodiment 2610 of the invention (e.g., similar to those that may be used for the embodiments shown in FIGS. 21-25). As shown, a plurality of rays 2602 is traced as they are focused through the components of the assembly 2610 (with a single lens being shown for simplicity with the understanding that each lens of the array is typically configured with a similar cross section). The ray tracing is performed to determine whether the lens or lenticule 2612 of a lens array is properly configured to focus on a set of image slices in an interlaced image 2634 through a number of components or layers of material between the back of the lens 2612 and the image 2634 rather than simply on the back of the lens 2612 as is the case with conventional lenticules.

Each material thickness and refractive index needs to be considered in the ray tracing to determine if the lens or lenticule 2612 is properly shaped. The assembly 2610 as shown includes the lens or lenticule 2612 and a clear adhesive 2614 that attaches the lens 2612 in position within the assembly 2610. The spatial or focusing gap of the assembly 2610 is provided by a layer of glass in this case such as that found in a window, door, or clear wall section but other materials may be used such as plastic or ceramic. Another clear or translucent adhesive layer 2630 is provided to attach an image substrate or element 2632 to the glass layer 2620, and the interlaced image 2634 is printed or otherwise provided on the substrate 2632. To generate the ray tracing the thickness and material (e.g., the refractive index) needs to be provided for each of these components of the assembly 2610.

Although only a representative assembly, the following component parameters were utilized in one specific assembly 2610 to produce a ray tracing 2600 showing the effectiveness of the use of a transparent material as a spatial gap filler (or defining layer). The lens 2612 was formed of a plastic with a refractive index of 1.64, a thickness of 10 mils, and a radius of 61.5 mils. The adhesive layers 2614 and 2630 were set at a thickness of 2 mils and had a refractive index of 1.4. The spatial gap was provided in this case by a layer of glass 2620 having a thickness of 125 mils and a refractive index of 1.513. The image 2634 was assumed to have a thickness of 0.01 mils and a refractive index of 1 while the image substrate 2632 was assumed to have a thickness of about 3 mils and a refractive index of 1.5. The ray tracing 2600 was produced for the assembly 2610 based on the processing of all of these parameters and was found, as shown, to provide a desired focusing onto the image 2634 at a width of about the width of a set of interlaced image segments in the image 2634. Of course other materials and thicknesses may be utilized for each layer or component of the assembly 2610, and the radius and thickness of the lens 2612 can be altered or modified to suit these differing materials (or refractive indices) and thicknesses. If the ray tracing does not result in effective or adequate focusing on the image, the shape (e.g., radius) and/or thickness of the lenticule 2612 can be modified to achieve a better result and such a process may be repeated on an iterative basis until the lens array is properly designed and mapped to the interlaced image 2634.

We claim:

1. A method of fabricating a lenticular display for producing graphical images, comprising:

providing a mounting area in a clear window or door formed of glass with a thickness of at least about 0.125 inches;

determining a thickness and refractive index for the clear window or door at the mounting area;

mounting a lens element in the mounting area on one side of the clear window or door, the lens element comprising a plurality of lenticules each with a focal point at least through the lens element and the clear window or door with the focal point being selected based on the thickness and refractive index of the clear window or door; and mounting an image element in the mounting area on a second side of the clear window or door opposite the lens element, the image element including an interlaced image printed upon a substrate, wherein a focusing gap of at least the thickness of the clear window or door is formed between the lenticules and the interlaced image and the interlaced image is positioned proximate to the focal points of the lenticules;

wherein the interlaced image is mirror printed upon the substrate and the substrate is mounted to the second side of the clear window or door using a layer of optically transparent adhesive abutting a side opposite to the interlaced image.

2. The method of claim 1, wherein the lens element has a thickness of less than about 10mils and the focusing gap is in the range of about 5 mils to about 1.5 inches.

3. The method of claim 1, wherein the lens element is attached to the one side of the clear window or door with a layer of optically transparent adhesive.

4. The method of claim 1, wherein lenticules each have a radius selected to focus on the focal point based on a thicknesses and refractive indices of the image element, the clear window or door, and the substrate of the image element.

5. The method of claim 1, further comprising aligning the lens element and the image element during the mounting steps by aligning registration marks on each of the lens and image elements with each other that define X-Y positioning of the lens array and the interlaced image, respectfully.

6. The method of claim 1, further comprising removing the image element from the mounting area and mounting a replacement image element on the second side of the clear window in the mounting area, the replacement image element comprising another interlaced image printed upon a substrate.

* * * * *

UNITED STATES PATENT AND TRADEMARK OFFICE
CERTIFICATE OF CORRECTION

| | | |
|---|---|---|
| PATENT NO. | : 7,457,039 B2 | Page 1 of 1 |
| APPLICATION NO. | : 11/675995 | |
| DATED | : November 25, 2008 | |
| INVENTOR(S) | : Raymond et al. | |

It is certified that error appears in the above-identified patent and that said Letters Patent is hereby corrected as shown below:

Title Page, insert --Related U.S. Application Data, (62) Continuation-in-part of Application No. 11/422,695, filed on June 7, 2006.--.

Column 38, line 12, delete "10mils", and insert therefor --10 mils--.

Signed and Sealed this

Seventeenth Day of March, 2009

JOHN DOLL
*Acting Director of the United States Patent and Trademark Office*